(12) United States Patent
Evans et al.

(10) Patent No.: US 10,586,996 B2
(45) Date of Patent: Mar. 10, 2020

(54) ELECTROLYTES FOR IRON FLOW BATTERY

(71) Applicant: ESS TECH, INC., Portland, OR (US)

(72) Inventors: Craig E. Evans, West Linn, OR (US); Yang Song, West Linn, OR (US)

(73) Assignee: ESS Tech, Inc., Wilsonville, OR (US)

( * ) Notice: Subject to any disclaimer, the term of this patent is extended or adjusted under 35 U.S.C. 154(b) by 352 days.

(21) Appl. No.: 15/436,593

(22) Filed: Feb. 17, 2017

(65) Prior Publication Data

US 2017/0179516 A1 Jun. 22, 2017

Related U.S. Application Data

(63) Continuation-in-part of application No. 14/201,244, filed on Mar. 7, 2014, now Pat. No. 9,865,895.

(Continued)

(51) Int. Cl.
*H01M 8/18* (2006.01)
*H01M 8/04186* (2016.01)
(Continued)

(52) U.S. Cl.
CPC ......... *H01M 8/188* (2013.01); *H01M 8/0482* (2013.01); *H01M 8/04186* (2013.01);
(Continued)

(58) Field of Classification Search
CPC .............. H01M 8/18; H01M 8/04186; H01M 8/04701; H01M 8/04791;
(Continued)

(56) References Cited

U.S. PATENT DOCUMENTS 4,075,066 A * 2/1978 Eckles ..................... C25D 3/22
205/313
4,785,814 A * 11/1988 Kane .................. A61B 5/14539
356/41

(Continued)

FOREIGN PATENT DOCUMENTS

WO 2012167057 A2 12/2012

OTHER PUBLICATIONS

FR 2299423 (Abstract) (Year: 1976).*

(Continued)

*Primary Examiner* — Alexander Usyatinsky
(74) *Attorney, Agent, or Firm* — McCoy Russell LLP

(57) ABSTRACT

A method of operating an iron redox flow battery system may comprise fluidly coupling a plating electrode of an iron redox flow battery cell to a plating electrolyte; fluidly coupling a redox electrode of the iron redox flow battery cell to a redox electrolyte; fluidly coupling a ductile plating additive to one or both of the plating electrolyte and the redox electrolyte; and increasing an amount of the ductile plating additive to the plating electrolyte in response to an increase in the plating stress at the plating electrode. In this way, ductile Fe can be plated on the negative electrode, and the performance, reliability and efficiency of the iron redox flow battery can be maintained. In addition, iron can be more rapidly produced and plated at the plating electrode, thereby achieving a higher charging rate for all iron flow batteries.

20 Claims, 17 Drawing Sheets

Related U.S. Application Data

(60) Provisional application No. 61/778,143, filed on Mar. 12, 2013.

(51) Int. Cl.
  H01M 8/04791 (2016.01)
  H01M 8/04701 (2016.01)
  H01M 8/20 (2006.01)

(52) U.S. Cl.
  CPC ......... H01M 8/04731 (2013.01); H01M 8/18 (2013.01); H01M 8/20 (2013.01); H01M 2300/0002 (2013.01); H01M 2300/0005 (2013.01); Y02E 60/528 (2013.01)

(58) Field of Classification Search
  CPC .. H01M 2300/0002; H01M 2300/0005; Y02E 60/528
  See application file for complete search history.

(56) References Cited

U.S. PATENT DOCUMENTS

| | | | |
|---|---|---|---|
| 6,284,123 B1 | 9/2001 | Cimermancic et al. | |
| 2002/0194905 A1* | 12/2002 | Moghissi | C23F 13/04 73/150 R |
| 2006/0222871 A1* | 10/2006 | Bonhote | C25D 5/18 428/457 |
| 2008/0193828 A1* | 8/2008 | Sahu | G01N 21/80 429/63 |
| 2013/0029185 A1* | 1/2013 | Ridley | H01M 10/48 429/51 |
| 2014/0227574 A1* | 8/2014 | Savinell | H01M 8/188 429/107 |
| 2014/0272493 A1* | 9/2014 | Evans | H01M 8/188 429/63 |
| 2014/0363747 A1 | 12/2014 | Evans et al. | |
| 2017/0179516 A1 | 6/2017 | Evans et al. | |

OTHER PUBLICATIONS

Hruska et all, J.Electrochem. Soc., 1981, 128, 18-25 (Year: 1981).*

Manohar, A. et al., "A High Efficiency Iron-Chloride Redox Flow Battery for Large-Scale Energy Storage," The Journal of Electrochemical Society, vol. 163, No. 1, Jan. 2016, 8 pages.

ISA Korean Intellectual Property Office, International Search Report and Written Opinion Issued in Application No. PCT/US2018/018251, dated May 11, 2018, WIPO, 14 pages.

Kasper, C., "Rapid Electrodeposition of Iron from Ferrous Chloride Baths," Journal of Research of the National Bureau of Standards, vol. 18, No. 5, May 1937, 8 pages.

Nagayama, M. et al., "The Anodic Oxidation of Iron in a Neutral Solution: 1. The Nature and Composition of the Passive Film," Journal of the Electrochemical Society, vol. 109, No. 9, Sep. 1962, 10 pages.

Nagayama, M. et al., "The Anodic Oxidation of Iron in a Neutral Solution: 2. Effect of Ferrous Ion and pH on the Behavior of Passive Iron," Journal of the Electrochemical Society, vol. 110, No. 6, Jun. 1963, 11 pages.

Hruska, L.W. et al., "Investigation of Factors Affecting Performance of the Iron-Redox Battery," Journal of the Electrochemical Society, vol. 128, No. 1, Jan. 1981, 8 pages.

Izaki, M. et al., "Hardness and Carbon Content of Fe Electroplate from Sulfate Bath Containing I-Ascorbic Acid and Citric Acid," Journal of the Surface Finishing Society of Japan, vol. 40, No. 11, Nov. 1989, 3 pages.

Fujiwara, Y. et al., "Effects of Hydroxycarboxylic Acids on the Electrodeposition of Fe—C Alloys," Denki Kagaku, vol. 61, No. 7, Jul. 1993, 3 pages.

Yin, K. et al., "Effects of Boric Acid on the Electrodeposition of Iron, Nickel and Iron-Nickel," Surface and Coatings Technology, vol. 78, No. 1-3, Jan. 1996, 6 pages.

Fujiwara Y. et al., "Electrodeposition of Fe—C Alloys from Baths Containing Dicarboxylic Acids with a Linear Alkyl Chain," Journal of the Electrochemical Society, vol. 143, No. 8, Aug. 1996, 7 pages.

Mellentine, J., "Performance Characterization and Cost Assessment of an Iron Hybrid Flow Battery," Master's Thesis, University of Iceland, Jan. 28, 2011, 136 pages.

* cited by examiner

FIG. 5

| | Structure | Complex with Fe/Ferric/Ferrous |
|---|---|---|
| Boric Acid | [structure of boric acid] | [complex structure] |
| Acetic Acid | [structure of acetic acid] | [complex structure] |
| Glycolic Acid | [structure of glycolic acid] | [complex structure] |
| Ascorbic Acid | Ascorbic acid / Isoascorbic acid | [complex structure] |

| | 25 °C | 40 °C | 50 °C | 60 °C |
|---|---|---|---|---|
| 14 mA/cm$^2$ |  | | | |
| 25 mA/cm$^2$ |  |  | | |
| 45 mA/cm$^2$ | |  |  |  |
| 54 mA/cm$^2$ | |  |  |  |
| 65 mA/cm$^2$ | | |  |  |
| 90 mA/cm$^2$ | | | |  |

ELECTROLYTES FOR IRON FLOW BATTERY

CROSS-REFERENCE TO RELATED APPLICATION

The present application is a continuation-in-part of U.S. patent application Ser. No. 14/201,244 entitled "METHODS TO PREPARE STABLE ELECTROLYTES FOR ALL IRON REDOX FLOW BATTERIES," filed on Mar. 7, 2014. U.S. patent application Ser. No. 14/201,244 claims priority to U.S. Provisional Patent Application No. 61/778,143 entitled "METHODS TO PREPARE STABLE ELECTROLYTES FOR ALL IRON REDOX FLOW BATTERIES," filed Mar. 12, 2013. The entire contents of the above-referenced applications are hereby incorporated by reference for all purposes.

ACKNOWLEDGMENT OF GOVERNMENT SUPPORT

This invention was made with government support under contract no. DE-AR0000261 awarded by the DOE, Office of ARPA-E. The government has certain rights in the invention.

BACKGROUND AND SUMMARY

The reduction-oxidation (redox) flow battery is an electrochemical storage device that stores energy in a chemical form and converts the stored chemical energy to an electrical form via spontaneous reverse redox reactions. The reaction in a flow battery is reversible, so conversely, the dispensed chemical energy can be restored by the application of an electrical current inducing the reversed redox reactions. A single redox flow battery cell generally includes a negative electrode, a membrane barrier, a positive electrode, and electrolytes containing electro-active materials. Multiple cells may be combined in series or parallel to create a higher voltage or current in a flow battery. Electrolytes are typically stored in external tanks and are pumped through both sides of the battery. When a charging current is applied, electrolytes lose electron(s) at the positive electrode and gain electron(s) at the negative electrode. The membrane barrier prevents the positive electrolyte and negative electrolyte from mixing while allowing ionic conductance. When a discharging current is applied, reverse redox reactions occur on the electrodes. The electrical potential difference across the battery is maintained by chemical redox reactions within the electrolytes and can induce a current through a conductor while the reactions are sustained. The amount of energy stored by a redox battery is limited by the amount of electro-active material available in electrolytes for discharge, depending on the total volume of electrolytes and the solubility of the electro-active materials.

Hybrid flow batteries are distinguished by the deposit of one or more of the electro-active materials as a solid layer on an electrode. Hybrid batteries may, for instance, include a chemical that plates as a solid on a substrate throughout the charge reaction and its discharged species may be dissolved by the electrolyte throughout discharge. In hybrid battery systems, the energy stored by the redox battery may be limited by the amount of metal plated during charge and may accordingly be determined by the efficiency of the plating system as well as the available volume and surface area to plate.

In a hybrid flow battery system the negative electrode may be referred to as the plating electrode and the positive electrode may be referred to as the redox electrode. The electrolyte within the plating side of the battery may be referred to as the plating electrolyte and the electrolyte on the redox side of the battery may be referred to as the redox electrolyte.

Anode refers to the electrode where electro-active material loses electrons. During charge, the negative electrode gains electrons and is therefore the cathode of the electrochemical reaction. During discharge, the negative electrode loses electrons and is therefore the anode of the reaction. Therefore, during charge, the plating electrolyte and plating electrode may be respectively referred to as the catholyte and cathode of the electrochemical reaction; the redox electrolyte and the redox electrode may be respectively referred to as the anolyte and anode of the electrochemical reaction. Alternatively, during discharge, the plating electrolyte and plating electrode may be respectively referred to as the anolyte and anode of the electrochemical reaction, the redox electrolyte and the redox electrode may be respectively referred to as the catholyte and cathode of the electrochemical reaction.

One example of a hybrid redox flow battery uses iron as an electrolyte for reactions wherein on the negative electrode $Fe^{2+}$ receives two electrons and deposits as iron metal during charge and iron metal loses two electrons and re-dissolves as $Fe^{2+}$ during discharge. On the positive electrode two $Fe^{2+}$ lose two electrons to form two $Fe^{3+}$ during charge and during discharge two $Fe^{3+}$ gains two electrons to form two $Fe^{2+}$:

$Fe^{2+} + 2e^- \leftrightarrow Fe^0$ (Negative Electrode)

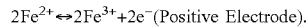

$2Fe^{2+} \leftrightarrow 2Fe^{3+} + 2e^-$ (Positive Electrode).

The electrolyte used for this reaction is readily available and can be produced at low costs (such as $FeCl_2$). It also has a high reclamation value because the same electrolyte can be used for the plating electrolyte and the redox electrolyte, consequently eliminating the possibility of cross contamination. Unlike other compounds used in hybrid redox flow batteries, iron does not form dendrites during plating and thus offers stable electrode morphology. Further, iron redox flow batteries do not require the use of toxic raw materials and operate at a relatively neutral pH unlike similar redox flow battery electrolytes. Accordingly, it is the least environmentally hazardous of all current advanced battery systems in production.

The inventors have recognized various issues with the above system. Namely, under certain extreme charging conditions, such as low temperature, or high charging current (whereby Fe is rapidly produced at the negative electrode due to fast charging conditions), iron plating may be stressed and could crack and flake off the negative electrode. Higher plating stress can thus degrade the negative electrode and reduce the capacity and efficiency of the redox flow battery cell.

One approach that at least partially addresses the above issues is a method of operating an iron redox flow battery system comprising: fluidly coupling a plating electrode of an iron redox flow battery cell to a plating electrolyte; fluidly coupling a redox electrode of the iron redox flow battery cell to a redox electrolyte; fluidly coupling a ductile plating additive to one or both of the plating electrolyte and the redox electrolyte; and increasing an amount of the ductile plating additive to the plating electrolyte in response to an increase in the plating stress at the plating electrode.

In another embodiment, a method of operating an iron redox flow battery system may comprise, responsive to a charging current density applied to an iron redox flow battery (IFB) cell increasing above a threshold charging current density, raising a concentration of a ductile plating additive above a threshold concentration in a plating electrolyte fluidly coupled to a plating electrode.

In another embodiment, a redox flow battery system may comprise: a redox flow battery cell, including a plating compartment and a redox compartment; a plating electrode fluidly coupled to a plating electrolyte in the plating compartment; a redox electrode fluidly coupled to a redox electrolyte in the redox compartment; a ductile plating additive fluidly coupled to one or both of the plating electrolyte and the redox electrolyte; and a controller, including executable instructions to raise a concentration of the ductile plating additive in one or both of the plating compartment and the redox compartment in response to a charging current density increasing above a threshold charging current density.

In this way, ductile Fe can be plated on the negative electrode, and the performance, reliability and efficiency of the iron redox flow battery can be maintained. In addition, iron can be more rapidly produced and plated at the plating electrode, thereby achieving a higher charging rate for all iron flow batteries.

BRIEF DESCRIPTION OF THE FIGURES

The patent or application file contains at least one drawing executed in color. Copies of this patent or patent application publication with color drawing(s) will be provided by the Office upon request and payment of the necessary fee.

FIG. 5 illustrates example compounds that formed from Iron and 4 different acidic compounds.

DETAILED DESCRIPTION

Figure 1:
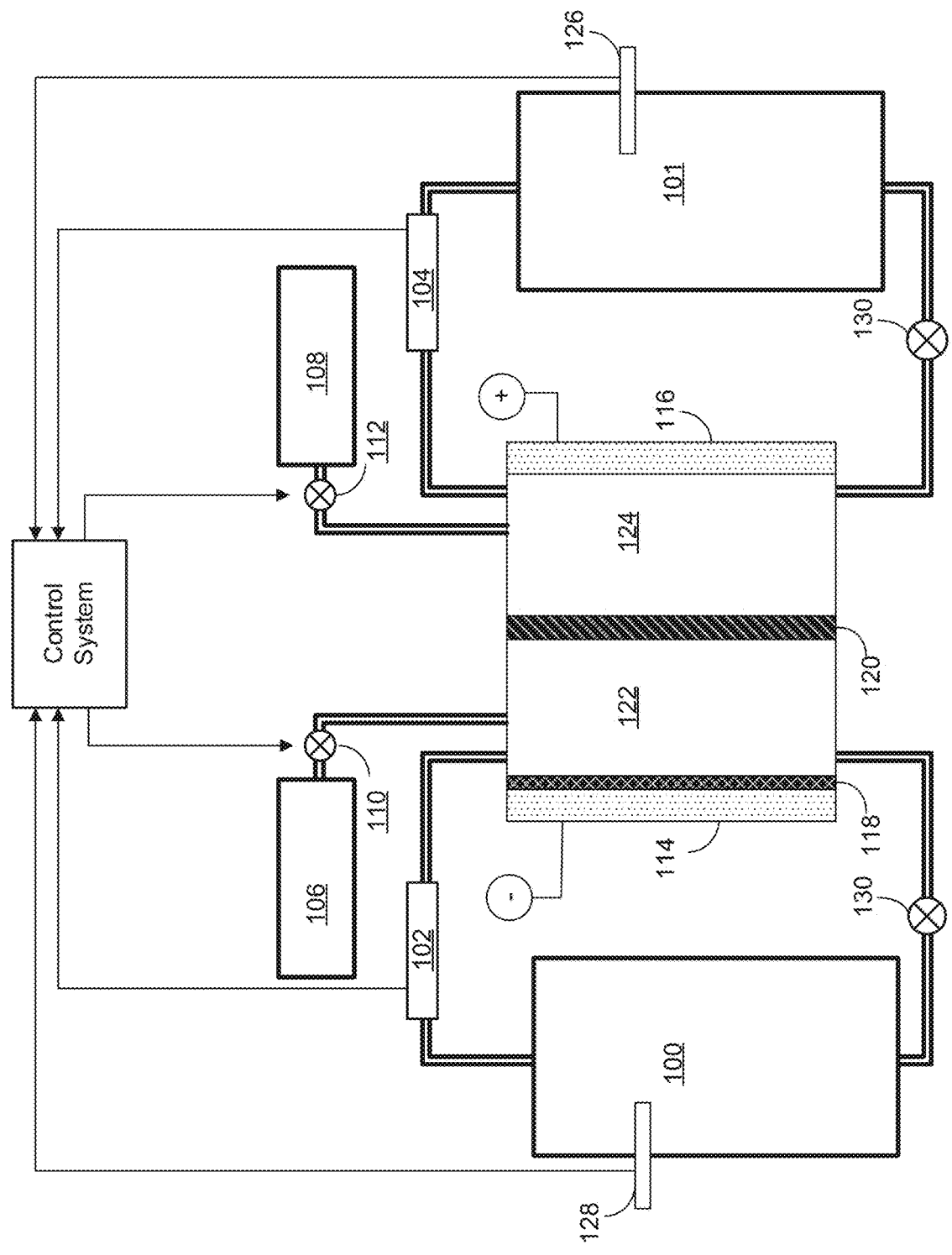
FIG. 1 is an example embodiment of the disclosed hybrid flow battery system.

As discussed above, the plating electrolyte used in the all iron redox flow battery (IFB) may provide a sufficient amount of $Fe^{2+}$ so that, during charge, it can accept two electrons from the negative electrode to form $Fe^0$ and solidify onto a substrate. During discharge, the solidified $Fe^0$ may then lose two electrons, ionizing into $Fe^{2+}$ and be dissolved back into the electrolyte. The equilibrium potential of the above reaction is −0.44V and thus this reaction provides a negative terminal for the desired system. On the positive side of the IFB, the electrolyte may provide $Fe^{2+}$ during charge which loses electron and oxidizes to $Fe^{3+}$. During discharge, $Fe^{2+}$ provided by the electrolyte becomes $Fe^{2+}$ by absorbing an electron provided by the electrode. The equilibrium potential of this reaction is +0.77V, creating a more positive terminal for the desired system.

The IFB provides the ability to charge and recharge its electrolytes in contrast to other battery types utilizing non-regenerating electrolytes. Charge is achieved by applying a current across the electrodes. The plating electrode may be coupled to the negative side of a voltage source so that electrons may be delivered to the electrolyte via the redox electrode. The $Fe^{2+}$ is thus oxidized to $Fe^{2+}$ and may be dissolved by the electrolyte for subsequent discharge. The electrons provided to the negative electrode can then reduce the $Fe^{2+}$ provided by the electrolyte to form $Fe^0$ at the plating substrate causing it to plate onto the electrode for discharge.

Discharge can be sustained while $Fe^0$ remains in the plating electrolyte for oxidation and the $Fe^{3+}$ remains in the redox electrolyte for reduction. The latter can be maintained by increasing the concentration or the volume of the electrolyte to the positive side of the battery to provide $Fe^{3+}$ ions via an external tank of the electrolytic chemical. The limiting factor is then more commonly the amount $Fe^0$ solidified onto the negative side of the battery and, consequently, proportional to the surface area and volume of the substrate that the iron may plate on as well as the efficiency of plating. Charge is limited by the same mechanism and solidifies as $Fe^0$ if ions are available for reduction, it may similarly be aided by an external tank providing additional electrolyte as needed.

In the above reaction the plating electrolyte chemical provides $Fe^{2+}$ and the redox electrolyte chemical provides $Fe^{2+}$ and $Fe^{2+}$ depending on the charge state of the system. The use of iron ions in the plating electrolyte and redox electrolyte provides the ability to use the same electrolytic chemical for both sides of the battery, minimizing the electrolyte cross-contamination that decreases the efficiency of the system eventually and leads to an eventual replacement of the electrolytes. In similar systems, low electrolyte reclamation value can prove an expensive maintenance cost. Further, production of the electrolyte is cost effective using inexpensive materials such as $FeCl_2$ and $FeCl_3$.

The electron configuration of iron allows it to solidify into a generally uniform solid structure on the substrate. In metals commonly used in similar redox batteries (such as Zinc) the solid structure may form dendrites during plating. The stable electrode morphology of the IFB increases the efficiency of the battery in comparison to other flow batteries. Further, no toxic raw materials are used in the battery and it utilizes electrolytes that generally operate at a pH between 1 and 3. Consequently, IFBs are the least environmentally hazardous of advanced battery systems currently in production.

However, the IFB has several key issues that contribute to performance and efficiency losses. In particular, battery efficiency losses result from electrolyte crossover through the membrane barrier. Ferric ions in the redox electrolyte are driven toward the plating electrolyte by the concentration gradient. Ferric ions that penetrate the membrane barrier may react with the iron metal on the negative side, resulting in coulombic efficiency losses. Ferric ions that penetrate from redox side (more acidic) to plating side (less acidic) can cause the formation and precipitation of Fe(OH)3. This precipitation can foul the organic functional group of an ion exchange membrane or can clog the small pores of the micro-porous membrane. In either case, membrane ohmic resistance rises over time and battery performance degrades. Additional coulombic efficiency losses can be attributed to 1) the reduction of H+ and subsequent formation of $H_2$ 2) the H+ ions emitted from the acidic electrolytes reacting with the plated iron metal to form $H_2$. The side reaction can result in hydrogen gassing on the negative side of the battery during charging.

$Fe(OH)_3$ precipitate formation resulting from oxidation and ferric ion crossover can cause barrier fouling. The resulting separator pore blockage may cause high battery ohmic resistance and low cell performance. Additionally, the redox electrode ($Fe^{2+}/Fe^{3+}$ couple) can experience performance losses over cycles due to a passivating oxide film accumulating on the carbon electrode surface.

FIG. 1 shows an example embodiment of an IFB. The plating electrolyte may be stored in plating electrolyte tank 100, the redox electrolyte may be stored in redox electrolyte tank 101. The plating electrolyte and redox electrolyte may be a suitable salt dissolved in water, such as $FeCl_2$ or $FeCl_3$. Both the plating electrolyte and redox electrolyte may use the same salt at different molar concentrations, a feature of the IFB not available in batteries with different reactive compounds. Both tanks may be fluidically coupled to the positive reactor 124 (redox compartment) and negative reactor 122 (plating compartment) of the flow battery. The positive reactor 124 is fluidically coupled to the positive electrode 116 (redox electrode), and the negative reactor 122 is fluidically coupled to the negative electrode 114 (plating electrode). During charging, a current or voltage source is applied across the negative and positive terminals of the redox flow battery cell; electrons are supplied to the negative electrode where plating occurs via reduction of the plating electrolyte, and electrons are supplied from the positive electrode via oxidation of the redox electrolyte.

Separating the negative and positive reactors and their respective electrolytes is barrier 120. The barrier may be embodied as a membrane barrier, such as an ion exchange membrane or a microporous membrane, placed between the redox electrolyte and plating electrolyte to prevent electrolyte cross-over and provide ionic conductivity. Sensors 102 and 104 may be used to determine the chemical properties of the electrolyte, including pH and may be embodied as an optical sensor. Probes 126 and 128 may additionally or alternatively be used to determine the chemical properties (discussed below) of the electrolytes. Other embodiments may have a plating electrolyte probe, plating electrolyte sensor, redox electrolyte probe, redox electrolyte sensor, or some combination thereof. The probe may also be placed inside the reacting portion of the IFB in negative reactor 122 and positive reactor 124. The acid additive may be in additional tank 106 and 108. These may contain different additives and be controlled by different routines. In other embodiments, the IFB may also have either a positive side additive or a negative side additive and not both. The positive side additive may be accelerated into the positive reactor 124 by positive additive pump 112; the negative additive may be accelerated into the negative reactor 122 by negative additive pump 110. Alternately, the electrolyte additives may be pumped into tanks 100 and 102. Positive additive and negative additive pumps 110 and 112 may be actuated via a control system communicatively coupled thereto. The control system may be responsive to probe 126, probe 128, sensor 102, sensor 104, or any combination thereof. The electrolytes may be pumped from the reactor by pumps 130.

Figure 2:
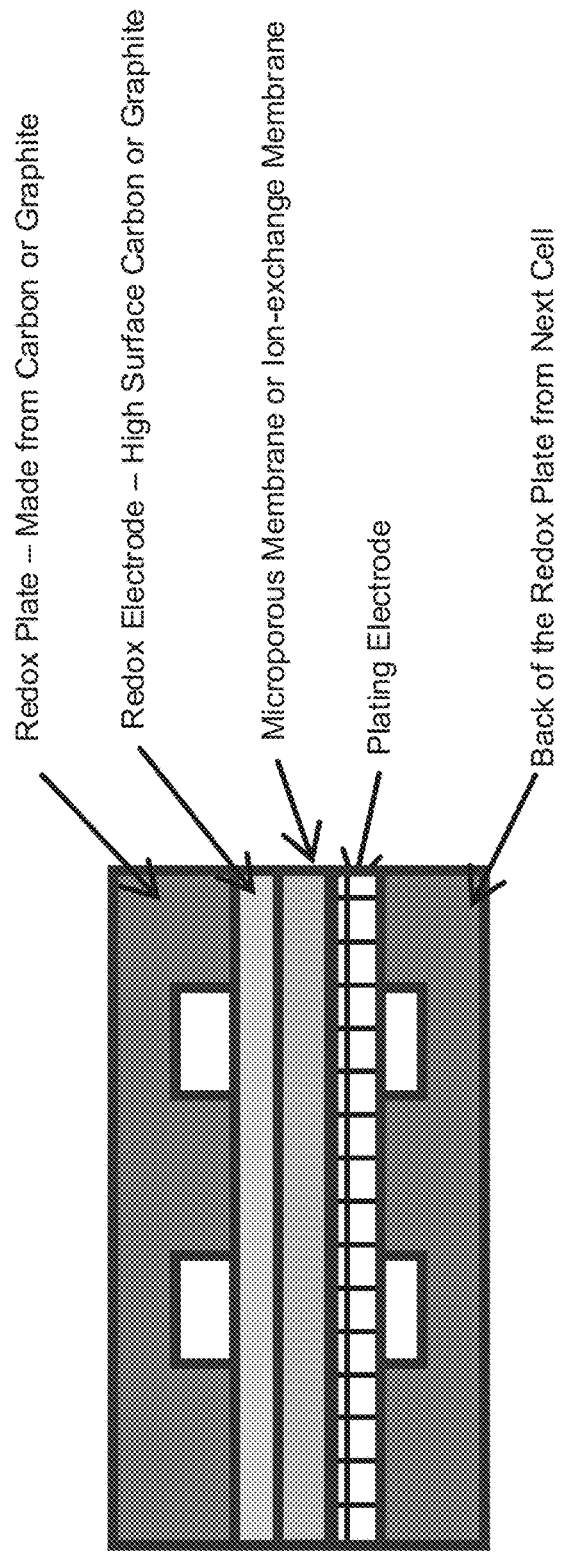
FIG. 2 shows a cross section of the disclosed hybrid flow battery system of FIG. 1.

FIG. 2 shows a cross section of an example cell of a hybrid all-iron flow battery. The top layer shows the redox plate that may be made of carbon or graphite or graphite composite. The redox electrode is adjacent to the redox plate and may be made of graphite or carbon fiber. The membrane is immediately adjacent to the redox electrode and the plating electrode and separates electrolytes therein. An example plating electrode may include a substrate structure on which the $Fe^0$ may solidify during charging. In IFB's made with multiple cells, a next redox plate of an adjacent cell may be a back face adjacent to the plating electrode.

Figure 3:
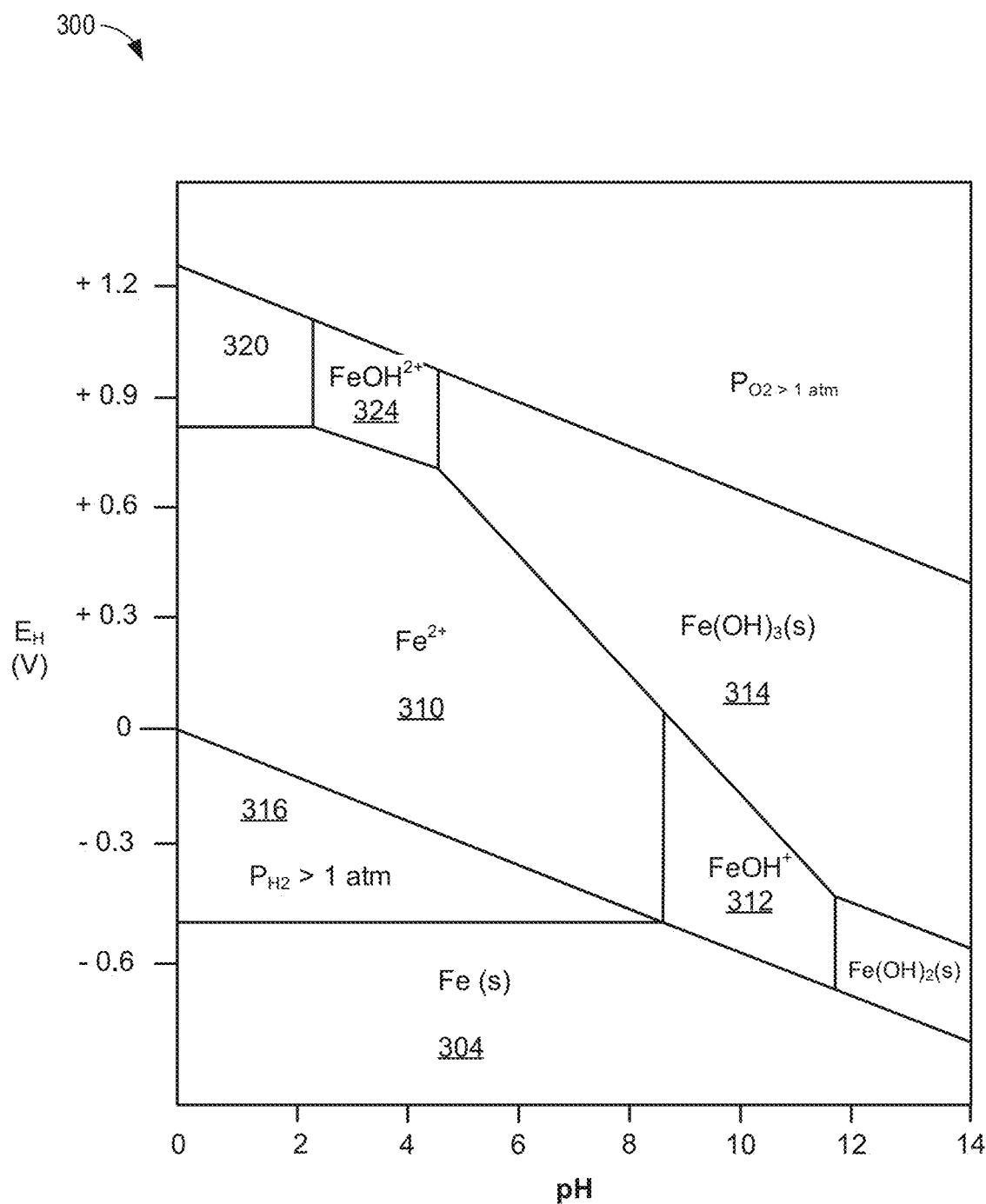
FIG. 3 is a Pourbaix diagram of Iron ions.

Cycling performance losses in the IFB may be attributed to the nature of the electrolytes' stability. FIG. 3 shows a Pourbaix diagram that helps to illustrate the electrolyte stability issue. The vertical axis of FIG. 3 represents the voltage potential with respect to the standard hydrogen electrode, pH is represented on the horizontal axis. During charge, $Fe^{2+}$ accepts two electrons to become Fe0. However, the reaction competes with the reduction of H+ and subsequent formation of H2. As a result, the electrolyte tends to stabilize at a pH range between 3 and 6 on the negative side of the battery.

During charge, the $Fe^{2+}$ on the positive side of the battery loses one electron to form $Fe^{3+}$, an ion with a much lower logarithmic acid disassociation constant (pKa) than that of $Fe^{2+}$. Therefore, as more ferrous ions are oxidized to ferric ions, the electrolyte tends to stabilize at a pH less than or closer to 1.

Concentration gradients on either side of the barrier during battery operation drive an amount of $Fe^{3+}$ over from redox electrolyte to plating electrolyte. The drastic change in pH from plating electrolyte to redox electrolyte (from 1 to 3-6) causes $FeOH^{2+}$ and Fe(OH)3 species to form and precipitate. These precipitates degrade the membrane by poisoning the organic functional group of an ion exchange membrane or clogging the small pores of the microporous membrane. As the result, the battery's ohmic resistance rises. Precipitate may be removed by washing the battery with acid, but the constant maintenance limits the batteries use in commercial applications, it also relies upon a regular preparation of electrolyte. However, the disclosed method suppresses the above reactions by adding specific organic acids to the electrolytes in response to indications of an electrolyte pH indicative of, and contributing to, these reactions.

Figure 4:
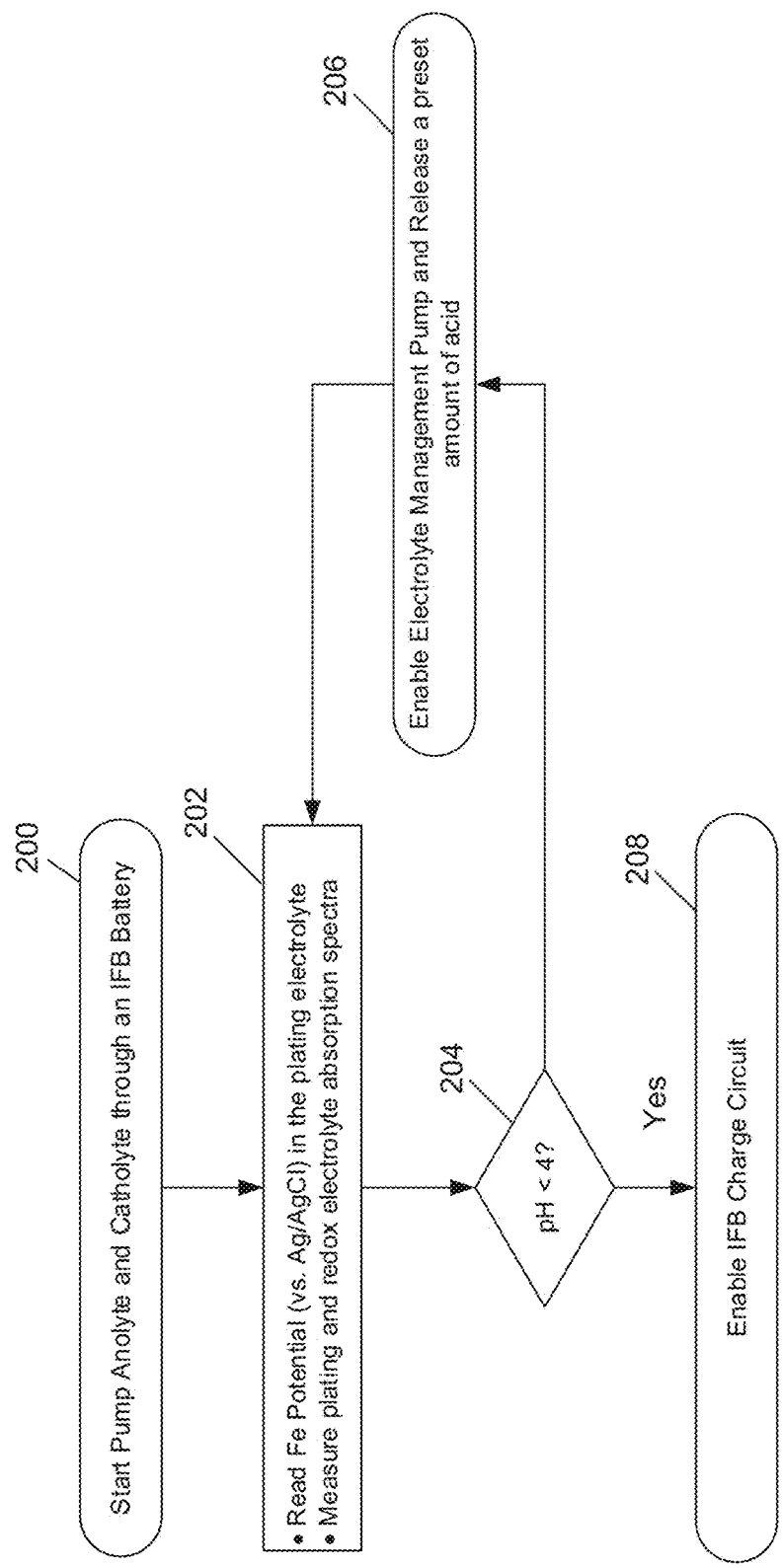
FIG. 4 depicts an example control routine within a hybrid flow battery system using the disclosed method.

Acidic additive may be added using the example method depicted in FIG. 4. The electrolytes may be pumped through their respective electrodes within the IFB at 200. At 202 the pH of the battery may be determined in the electrolyte using a Fe probe to measure the electrolyte potential vs. a reference electrode, such as Ag/AgCl or H2 electrode, in the plating electrode. Alternately, the pH may be monitored by measuring the reflective spectra of the electrolyte using an optical sensor via a method that will be further discussed. Other pH sensing devices not otherwise specified may also be used for the pH determination. Sensors monitoring temperature and other operating conditions may also be communicatively coupled to a control system and used in conjunction with electrolyte pH within the disclosed method. Note that the information provided by these additional sensors may be included in the operational definition of the term "pH" when used as a system control variable herein.

In the disclosed system, the sensors and/or probes may communicate to a control system the pH of the electrolyte. If the pH of the plating electrolyte is found to be above a threshold, such as pH>4, the control system may actuate the release of a preset amount of a prepared acid that may be added to the plating electrolyte at 204. If the pH of the redox electrolyte is found to be above a threshold, such as pH>1, the control system may actuate the release of a preset amount of a prepared acid to the redox electrolyte. The acid additive added to the negative and positive sides may be the same or different and may include but are not limited to hydrochloric acid, boric acid, ascorbic acid, acetic acid, malic acid, lactic acid, citric acid, tartaric acid, isoascorbic acid, malonic acid, glycolic acid, or any combination thereof. The process may return back to 202 to again measure the pH, the process may repeat until the pH falls below the threshold. If the pH is below the threshold the IFB may continue to charge or discharge.

The disclosed embodiment achieves suppression of the aforementioned problematic reactions by adding specific chemicals (acid additives) to the electrolytes. The acid additives to the electrolytes may stabilize $Fe^{2+}$ crossover from the redox electrolyte to the plating electrolyte, thus the acid additives used in the embodiment have specific chemical properties. Chemical additives that are organic chemicals with short chains (<6C) and with —OH and/or —COOH groups are sought to stabilize the ferric/ferrous ions by forming large complexes with these ions. A shorter carbon chain is sought to minimize the negative effect these organic acids may have on overall battery coulombic efficiency because these organic acids may have the side reaction of carbon formation during battery charging. The acids studied for addition and some of their properties are listed in table 1 below.

TABLE 1

Organic Acids Tested for Stabilizing IFB Electrolytes

| Acid | Equation | Efficiency pH >2.5 | % Carbon | g/mol | pKa | Notes |
|---|---|---|---|---|---|---|
| Boric | $H_3BO_3$ | | | 64.0 | 9.237 | Reported for $H_2$ suppression |
| L-Ascorbic | $C_6H_8O_6$ | | | 176.12 | 4.10 | C-A bath but also used with citric acid |
| Glycolic | $C_2H_4O_3$ | 93% | 0.00% | 79.050 | 3.83 | Testing at 10 mA/cm$^2$. Grayish dull, rough surface |
| L-lactic | $C_3H_6O_3$ | 79% | 0.00% | 90.080 | 3.86 | Testing at 10 mA/cm$^2$. Grayish dull, rough surface |
| L-Malic | $C_4H_6O_5$ | 90% | 0.60% | 134.090 | 3.40 | Testing at 10 mA/cm$^2$. Black and bright surface. Black oxides precipitated at current densities above 33 mA/cm$^2$. Black color was only due to surface film |
| L-Tartaric | $C_4H_6O_6$ | >90% | >2.5% | 150.087 | 2.95 | Testing at 10 mA/cm$^2$. Burnt. Lots of black precipitates |
| Citric | $C_6H_8O_7$ | 83% | 1.00% | 192.124 | 3.09 | Testing at 10 mA/cm$^2$. Black and bright surface. Black oxides precipitated at current densities above 39 mA/cm$^2$. Black color was only due to surface film |
| Oxalic | $C_2H_2O_4$ | 95% | 0.13% | 90.030 | 1.25 | Testing at 10 mA/cm$^2$. Grayish dull, rough surface |
| Malonic | $C_3H_4O_4$ | 95% | 0.13% | 104.060 | 2.83 | Testing at 10 mA/cm$^2$. Grayish dull, rough surface |
| Acetic | $C_2H_4O_2$ | 95% | 0.10% | 60.050 | 4.76 | Testing at 10 mA/cm$^2$. Grayish dull, rough surface |
| Butonic | $C_4H_8O_2$ | 95% | .0.15% | 88.110 | 4.82 | Testing at 10 mA/cm$^2$. Grayish dull, rough surface Stinky |
| Erythorbic | $C_6H_8O_6$ | | | 176.18 | 2.1 | In patent as additive |

A few examples of the complex structure with ferrous/ferric ions are shown in FIG. 5.

TABLE 2

Organic-Ferrous/Ferric Stability with pH

| pH | Acetic Acid | Ascorbic Acid | Isoascorbic Acid | Malonic acid |
|---|---|---|---|---|
| >2 | No Precipitation | No Precipitation | No Precipitation | No Precipitation |
| >3 | Precipitation | No Precipitation | No Precipitation | No Precipitation |
| >4 | Precipitation | No Precipitation | No Precipitation | No Precipitation |

The inventors determined electrolyte stability with these additives and Fe plating coulombic efficiencies using an H-Cell setup. Baths were prepared from reagent-grade chemicals and deionized distilled water that contained 0.5 mol/l $FeCl_2$ and various ratio of one of the organic acids. Bath initial pH ranged from 2 to 3 and they were not adjusted. A graphite rod was used as the plating electrode and a graphite plate was used as the redox electrode. Electrodeposition was carried out at a constant current density of 10 mA/cm2. The bath was kept at room temperature. The baths were not agitated because bath agitation decreases current efficiency since the H reduction current attains the diffusion limited current at a more noble potential than Fe deposition and therefore increases with agitation. Current efficiency was evaluated from the weight of the deposits obtained at a given amount of charge assuming that only Fe was deposited from $Fe^{2+}$; this assumption is valid because of the relatively low carbon and oxygen content in the deposits.

Figure 6:
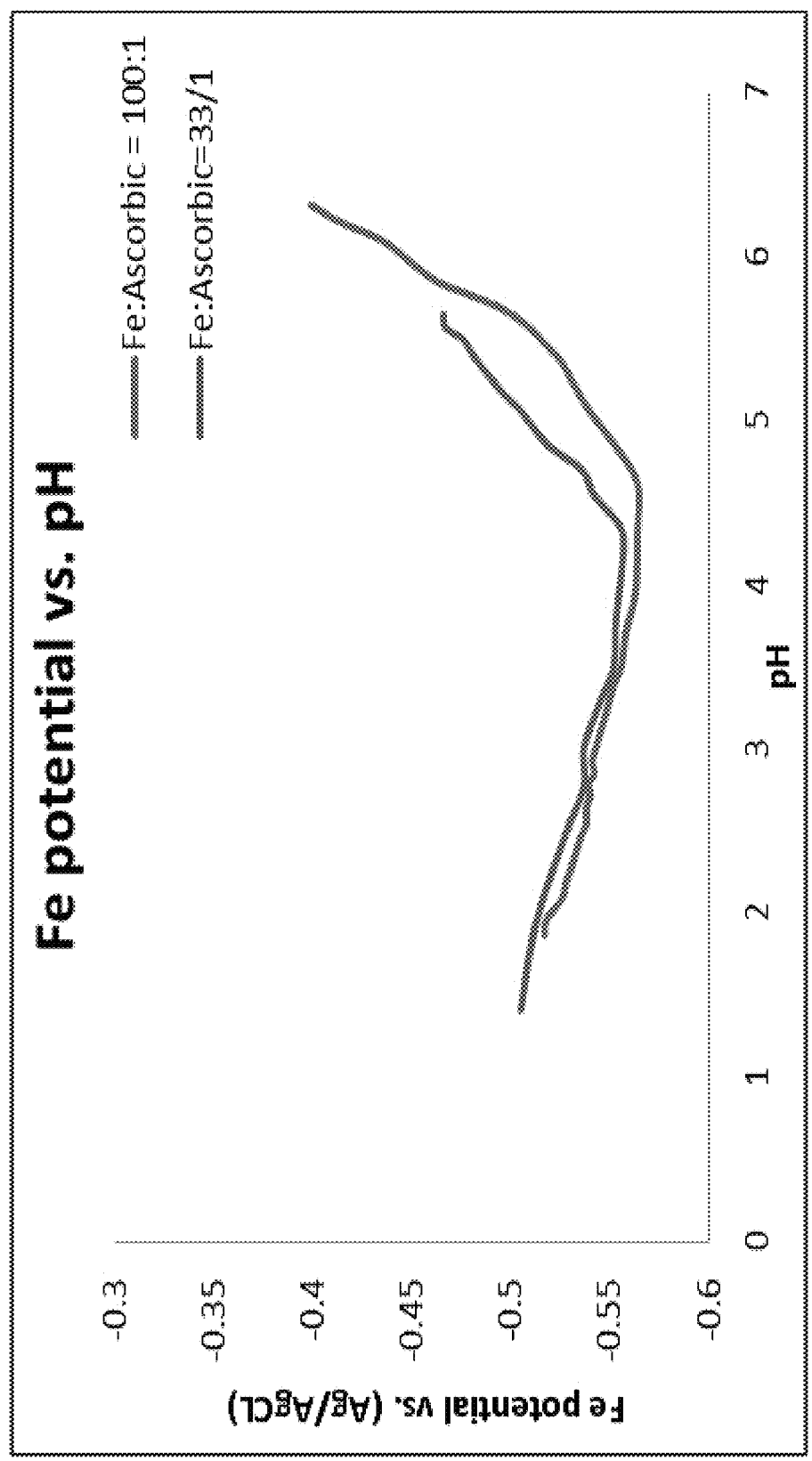
FIG. 6 graphically depicts the Fe potential vs. pH of two electrolytes with different Iron concentrations.

The equilibrium potentials of an iron surface in IFB electrolytes at various solution pH and different Fe-to-organic-acid ratios are shown in FIG. 6. As shown, Fe equilibrium potential decreases slightly between pH 1 to pH 4 and then the equilibrium potential rises significantly with pH. The increase is due to thin layers of iron oxide that form on the iron surface at higher pH levels. When running an IFB, if the electrolyte pH changes from 4 to 5, the battery plating equilibrium potential could be 50 mV worse, and as the result, the IFB performance could be 50 mV worse.

The Fe potential as a function of pH is graphically represented in FIG. 6. The relationship depicted in FIG. 6 may be used by the control system to meter pH in the disclosed system. In an embodiment, the control system may measure Fe potential and determine pH using the relationship depicted in FIG. 6, or a similar relationship for a corresponding Fe concentration. The pH measurement may be used in the method described in FIG. 4. In other embodiments, the control system may initiate or increase the addition of an acid additive in order to achieve a desired Fe potential determined by the relationship depicted in FIG. 6.

Figure 7:
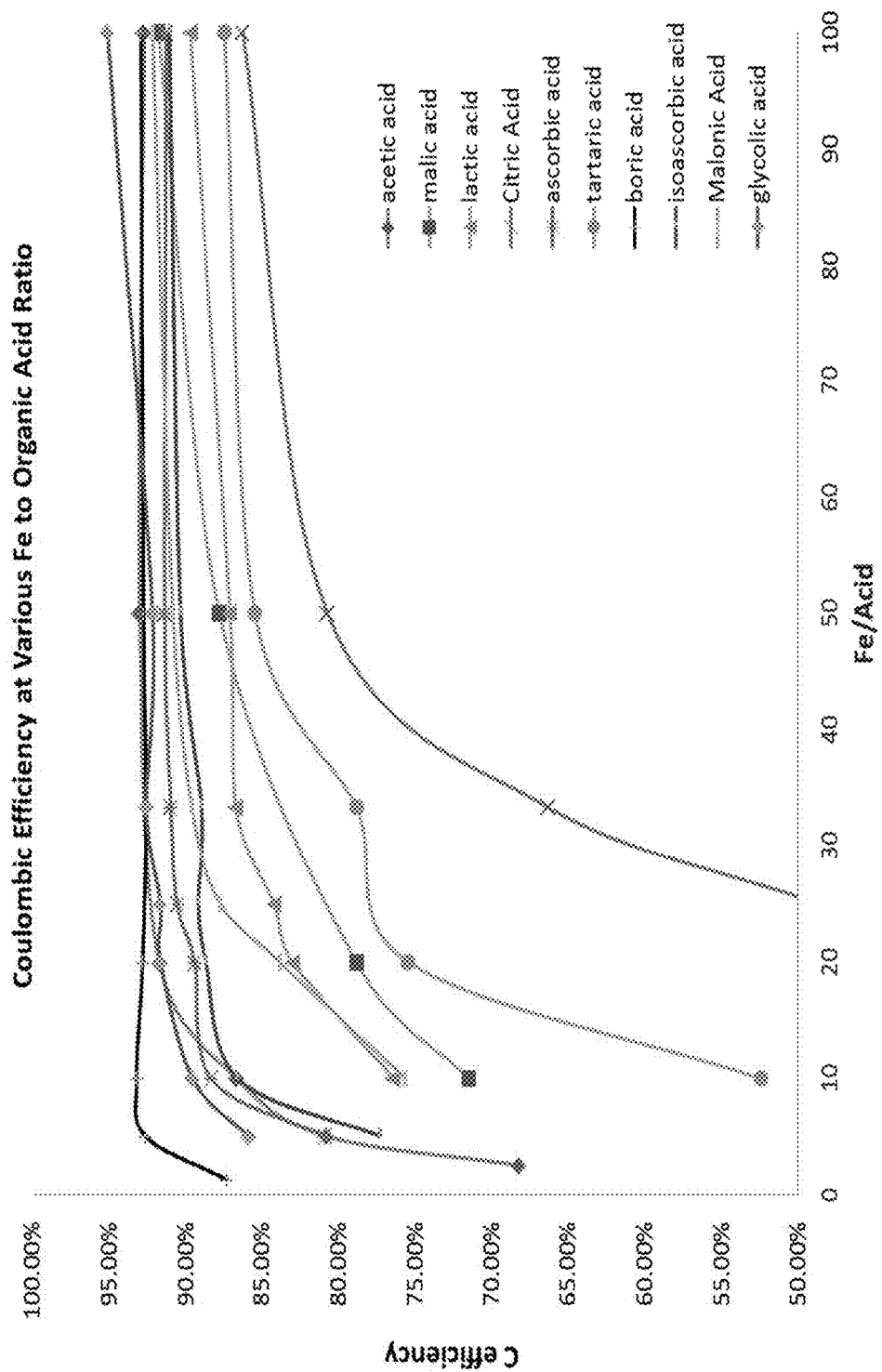
FIG. 7 graphically depicts the Coulombic efficiency to Fe:Acid concentrations of several acids.

The coulombic efficiency of Fe plating using these organic acids at various ratios is presented in FIG. 7. The relationship presented in FIG. 7 may, in some of the disclosed embodiments, be determinative of the chemical composition of the acid additives employed. For example, if a coulombic plating efficiency above 85% is desired, and malonic acid is used as the acid additive, the control system may maintain a Fe/Acid ratio above 20%. The ratio may be maintained via a predetermined maximum amount of acid additive that may be based on the volume and composition of the electrolyte. As shown in FIG. 7, boric acid, ascorbic acid, L-ascorbic acid, glycolic acid, acetic acid and malonic acid all show high Fe plating coulombic efficiencies at high Fe to acid ratios. As more acid (lower Fe:acid ratio) were added to the electrolyte, plating coulombic efficiencies drops. This results from the formation of carbon from the organic acids during charging. This chart was used to define the range of organic acids used in the battery.

Figure 8:
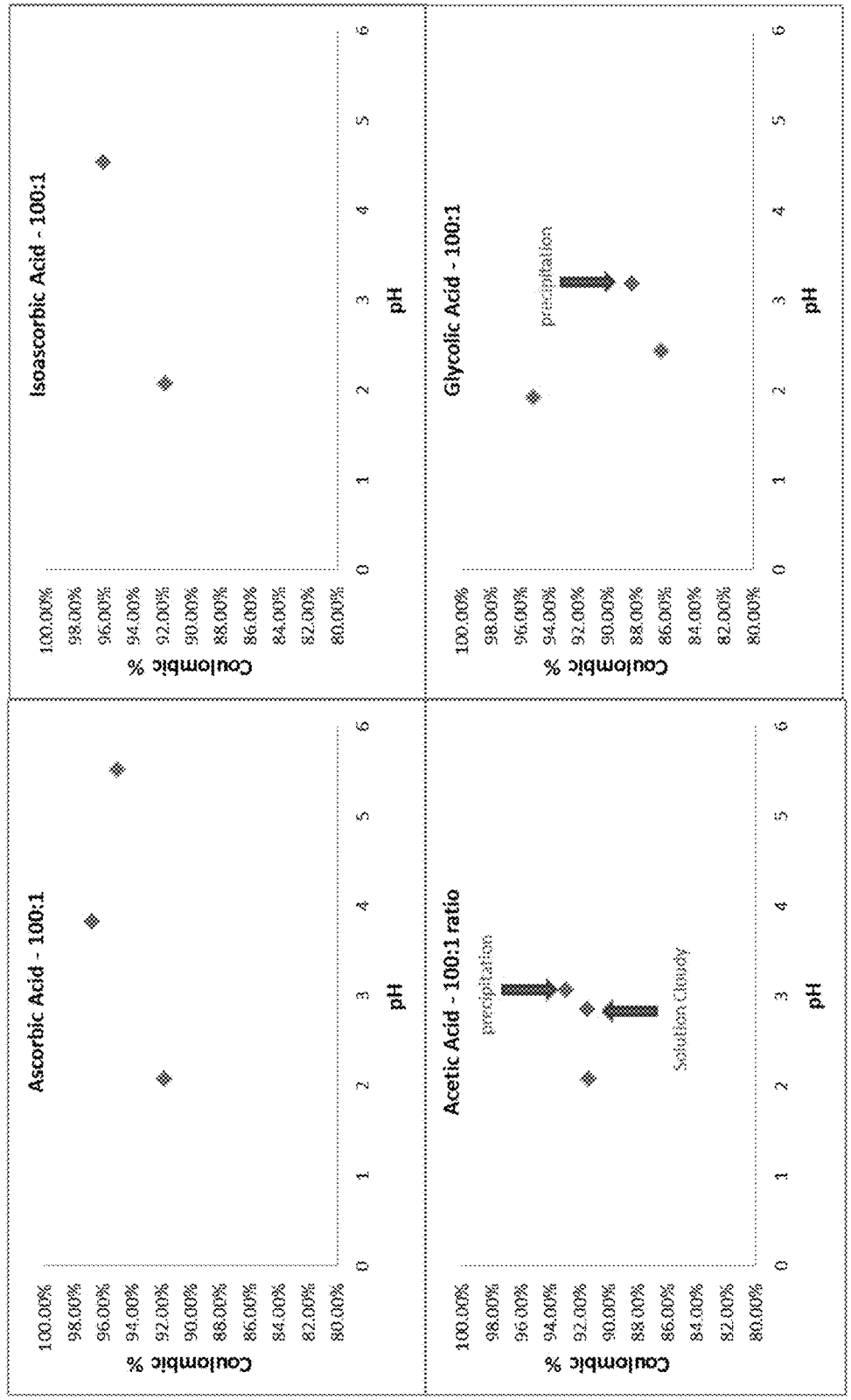
FIG. 8 graphically depicts the Coulombic plating efficiency to pH ratio of 4 different acid additives.

Furthermore, the same H-cell tests were performed on several Fe:organic acid ratios to study the crossover ferric ion stability at various pH of the plating side as shown in FIG. 8. In some embodiments of the disclosed system, the results in FIG. 8 were used by the control system to determine the desired pH of the electrolytic solution to achieve a desired coulombic efficiency. As an example, FIG. 8 graphically depicts the coulombic efficiency of iron plating for different plating solution pH levels. As shown in Table 2 and FIG. 8, acetic acid and glycolic acid (not shown) alone cannot stabilize the crossover ferric ion at high pH. However, ascorbic or isoascorbic acid alone is not ideal to be used as the organic acid because of C formation leading to reduced coulombic efficiency. Carbon formation was detected through electron microscope scanning on iron film plated from a bath with ascorbic acid only.

Therefore, in some embodiments of the disclosed system, combination of organic acid additives may be utilized to achieve the optimal iron plating bath for performance, efficiency, and stability. In an example embodiment, an electrolyte solution of $FeCl_2$ and NaCl, a first acid (such as boric acid) can be added for H2 side reaction suppression and high coulombic efficiencies. Additionally, a second acid (such as ascorbic acid) can be added for ferric ion stability and a third acid (such as glycolic acid) can be added for minimizing carbon formation.

Figure 9:
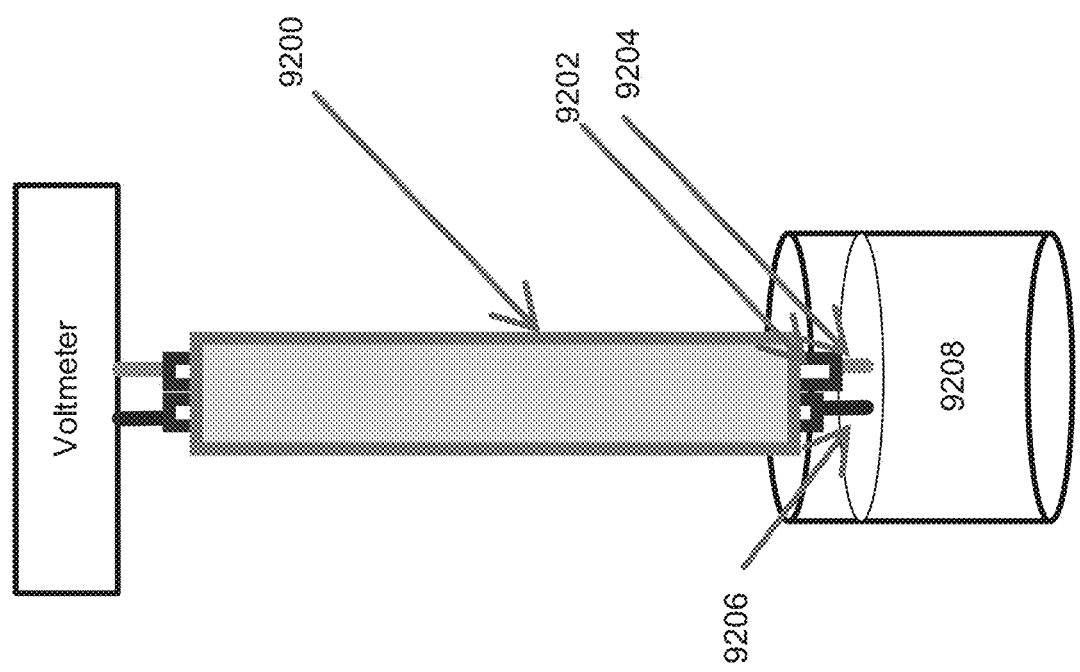
FIG. 9 depicts an example embodiment of an electrolyte probe for the disclosed system.

To mitigate electrolyte sensitivity to pH, an example battery may use the iron potential probe shown in FIG. 9. The probe may be produced with a clean iron wire in conjunction with a reference electrode such as an Ag/AgCl wire or a H2 electrode. The probe can be placed in the electrolyte tank where Fe potential may be monitored over time. When Fe potential of the electrolyte drifts up, a calculated small amount of acid can be added to the electrolyte to adjust its pH. By metering the amount of electrolyte additive added in response to the presiding pH, the electrolytes can be more precisely maintained at the ideal pH and composition for redox.

The embodiment in FIG. 9 is an Fe potential probe that may be used to measure the potential on $Fe^0$ and a corresponding pH within the plating electrode. The potential probe may have inert electrode 9206 that may be a wire made of iron or another inert or quasi-inert metal such that the electrons in the metal will not oxidize or will oxidize at a known rate. Reference electrode 9204 may be a wire containing silver (Ag) and an Ag salt such as AgCl or a H2 reference electrode. For example, in an embodiment, the Fe probe may be placed in the plating electrolyte to measure solution potential on Fe. Further, Fe may represent the solution potential and pH for the plating side of the battery. The electrodes may be electrically isolated from each other by insulator 9202 that may be made of any material with low or no conductivity. Heat shrink 9200 acts to keep the Fe and the reference electrode at a set distance.

In other embodiments of the disclosed system, the pH of the electrolytes may also be monitored by a sensor that may be used independently, or in combination with, the probe. In an embodiment, the optical sensor may measure the absorption spectrum of ambient light through the liquid to determine the corresponding pH. The optical sensor can also be used to monitor battery state of charge if chelating organic acid is added to the electrolyte to increase iron ion stabilities. This is because chelated iron complex shows different color at different pHs. For example, if ascorbic acid is used as the chelating agent, the iron solution color goes from green to violet and then black from pH of 2 to pH of 6.

Figure 10:
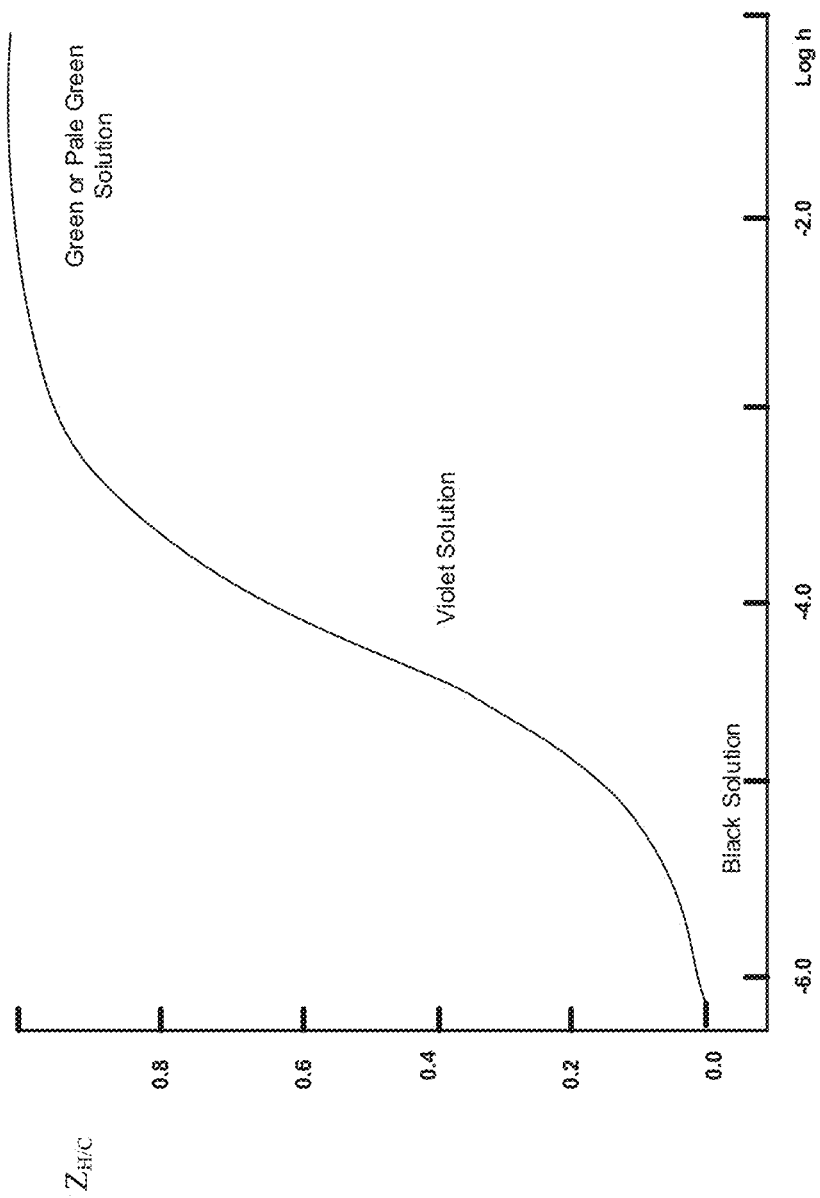
FIG. 10 graphically depicts the color of an example electrolyte as a function of pH.

The control system communicatively coupled to the sensor may determine the pH using the pH to color relationship depicted in FIG. 10. Here the pH-color relationship depicted graphically, in which the vertical axis represents the average number of W bound per carbon atom and the horizontal axis is a logarithmic representation of h. As shown, at low pH (higher number of W bound per C) the solution is green or pale, as the number of free W increases (increasing pH) the solution becomes violet and eventually black when the average number of free $H^+$ is highest. By measuring the wavelength of ambient light or a light from a known source through and/or reflected by the electrolyte, the pH of the electrolyte may be determined.

In an example embodiment, white light may be incident on the surface of the electrolyte. A spectroscope may be utilized within the sensor to determine the wavelength of light reflected by the electrolyte. If a reflected and/or transmitted wavelength is found to be, for instance, less than 450 nm (corresponding to a violet hue) acid additive may be added to the solution to lower the electrolyte pH. Further, the spectroscope may continue to monitor the absorption spectra of the electrolyte and if the reflected and/or transmitted wavelength is found to be above a threshold, such as 510 nm (corresponding to a green hue), the addition of acid additive may be terminated.

On the negative side of the IFB, during charge $Fe^{2+}$ accepts two electrons and forms $Fe_0$. The competing reaction on the negative side of the battery ($H^+$ accepts one electron and forms $H_2$) results in the tendency of the electrolyte on the negative side of the IFB to rise over cycles from pH of 2 to pH of 6 thus embodiments of the disclosed system may use the probe and sensors above to monitor pH change.

As shown previously in FIG. 6, the pH change may result in up to 100 mV 'apparent' performance loss of the battery due to Fe equilibrium potential drifting up with higher pH level. To mitigate performance loss, an embodiment of the disclosed Fe Potential Probe or optical sensor, such as those described above, may be used to monitor battery state of charge as well as the electrolytes' pH level.

The operation window for the plating electrolyte of the battery is between pH of 3 and 4. Therefore, in an embodiment, when either a Fe Potential Probe or an optical sensor shows a pH level above 4, a small, pre-calculated amount of acid may be added to the plating electrolyte solution to return the plating electrode to an optimal pH range. As a result, the battery performance may be stabilized.

Figure 11:
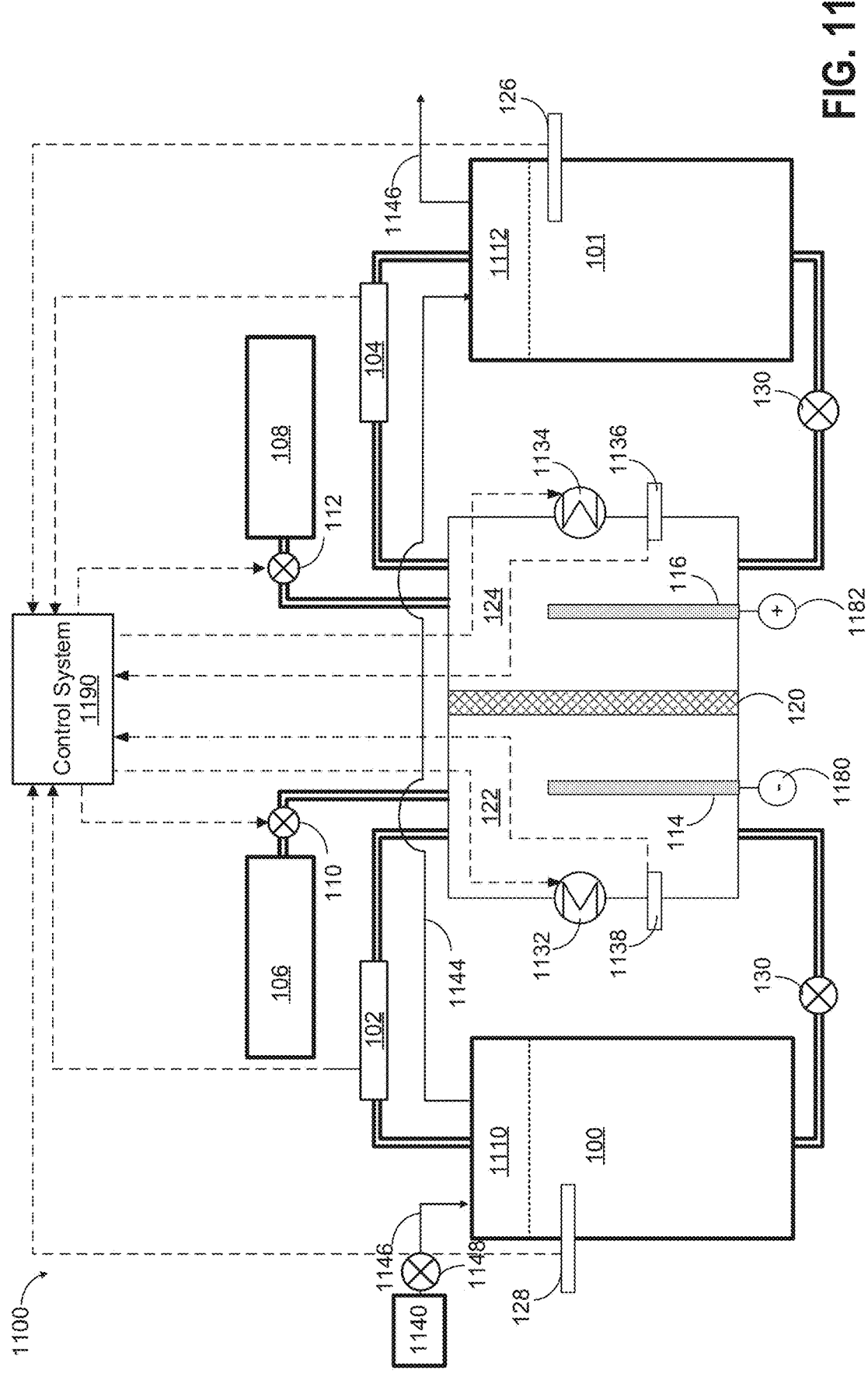
FIG. 11 is a schematic of an example redox flow battery system.

Turning now to FIG. 11, it illustrates a schematic of another example redox flow battery system 1100, including the control system 1190, and a redox flow battery cell fluidly coupled to the plating electrolyte tank 100, redox electrolyte tank 101, and additional tanks 106 and 108. Additional tanks 106 and 108 may each include one or more storage tanks for storing additives such as acid additives for modifying the plating and redox electrolyte pH (as discussed above), or ductile plating additives (DPAs) for rapid ductile Fe production at the plating electrode 114, as discussed below. DPAs may be delivered via additive pumps 110 and 112 to the plating electrolyte tank 100 and the redox electrolyte tank 101, respectively. Furthermore, in the case where additional tanks 106 and 108 each represent one or more storage tanks for storing multiple types of additives, additive pumps 110 and 112 may each correspondingly represent multiple pumps, each dedicated to delivering one of the multiple types of additives from one of the additional tanks, to reduce cross-contamination. In other embodiments, additives such as acid additives or DPAs may be added directly to plating electrolyte tank 100 and/or redox electrolyte tank 101. In such examples, the additional storage tanks 106 and 108, and pumps 110 and 112, may not be present. The negative and positive current collectors 1180 and 1182 may be conductively coupled to a voltage or current source during charging, and may be conductively coupled to supply power to a load during discharge. During charging, the control system 1190 may be conductively coupled to the voltage or current source in order to regulate the charging current density (CCD) supplied to the redox flow battery cell via current collectors 1180 and 1182.

Redox flow battery system 1100 may further include heaters 1132 and 1134 thermally coupled to the plating electrolyte and the redox electrolyte, respectively. In the example of FIG. 11, heaters 1132 and 1134 are thermally coupled to the plating compartment 122 and the redox compartment 124. In another example, heaters 1132 and 1134 may be positioned in the plating electrolyte tank 100 and the redox electrolyte tank 101. Heaters 1132 and 1134 may be controlled by control system 1190 to regulate the temperature and the amount of heat supplied to the plating and redox electrolytes, respectively. Sensors 1138 and 1136 may include temperature, pH, and conductivity sensors and may each transmit signals to the control system 1190 indicating the status of the plating and redox electrolytes, respectively. Sensors 1138 and 1136 may further include sensors that are able to provide an indication of plating stress at the plating electrode 114. For example, plating stress can be indicated by electrolyte temperature since plating stress can be lower at higher temperatures. Furthermore, electrolyte composition, especially when DPAs are added to the electrolyte, can affect plating stress levels. Sensors 1138 and 1136 may further include sensors providing a more direct measurement of internal plating stresses at the plating electrode 114, such as spiral contractometers, bent strip sensors, and internal stress sensors. In another example, loose Fe particles or flakes in the electrolyte may be collected at the outlet of the plating electrolyte tank 100 (negative electrolyte tank) to aid in quantifying or estimating plating stresses at the plating electrode 114. In particular, a magnetized trap (not shown in FIG. 11) may be positioned at the outlet of the plating electrolyte tank to immobilize or trap loose Fe particles or flakes detaching from the plating electrode as a result of internal plating stresses. A higher rate of Fe particle deposition collected at the trap may indicate a higher plating stress at the plating electrode 114, whereas a lower rate of Fe particle deposition collected at the trap may indicate a lower plating stress at the plating electrode 114. Other methods or types of sensors may be used to estimate or determine the plating stress at the plating electrode 114 in real-time. Accordingly, the control system 1190 may actuate heaters 1132 and 1134, additive pumps 110 and 112, electrolyte pumps 130, inert gas metering device 1148, and the like, responsively to signals transmitted from one or more of sensors 1138, 1136, 128, 126, 102, and 104.

Alternately, the plating stress may be empirically estimated or modeled based on the flow battery operating conditions. For example, the plating stress may be determined as a function of one or more of the charging current density, the electrolyte temperature, the electrolyte composition, the electrolyte pH, the concentration of additives in the electrolyte, and the like. For example, the plating stress may be correlated to the electrolyte temperature and the charging current density, as shown by the plot 1600 of FIG. 16. Region 1620 corresponds to flow battery operating conditions (electrolyte temperature, and charging current density) resulting in a higher plating stress and where a risk of cracking of the plated electrode is increased. In contrast region 1640 corresponds to flow battery operating conditions under which the plating stress is lower, resulting in ductile plating of the electrode (lower risk of cracking of the plated electrode). In other words, trend line 1630 plots a threshold charging current density above which plating stress increases such that a plating electrode quality is reduced as a function of a threshold electrolyte temperature below which a plating electrode quality is reduced. For a given electrolyte temperature, operating the redox flow battery above the threshold charging current density (as indicated by trend line 1630) may result in higher stress plating and cracking of the electrode. For a given charging current density, operating above the threshold electrolyte temperature (as indicated by trend line 1630) may result in lower stress ductile plating.

Accordingly, the control system 1190 may actuate heaters 1132 and 1134, additive pumps 110 and 112, electrolyte pumps 130, inert gas metering device 1148, and the like, responsively to one or more flow battery operating conditions increasing or decreasing beyond a threshold value. For example, control system 1190 may actuate heaters 1132 and 1134 to increase an amount of heat generated and transferred to the electrolyte responsively to an electrolyte temperature decreasing below the threshold electrolyte temperature. As another example, control system 1190 may be conductively coupled to a voltage or current source coupled to the redox flow battery current collectors. In response to a charging current density increasing above a threshold charging current density, control system 1190 may reduce the current supplied by the voltage or current source, in order to reduce a risk of high stress plating that can lead to cracking of the electrode. Reducing current supplied by the voltage or current source so that the charging current density decreases below the threshold charging current density may increase the ductility of the plating at the plating electrode. In another example, the control system 1190 may actuate additive pumps 110 and/or 112 to increase a rate of addition of DPAs to the flow battery system responsive to an indication of a higher plating stress at the plating electrode (e.g., temperature decreasing below threshold electrolyte temperature, charge current density increasing above a threshold charging current density, rate of Fe particles collected at outlet of plating electrolyte tank increasing above a threshold rate, and the like). Furthermore, in the case where the DPAs and other electrolyte additives are added directly to the plating electrolyte tank 100 and the redox electrolyte tank 101, the control system 1190 may increase an amount of or a rate of addition of DPAs to the plating electrolyte tank 100 and/or the redox electrolyte tank 101 responsive to an indication of a higher plating stress at the plating electrode.

Inert gas may be introduced to the plating electrolyte tank 100 and the redox electrolyte tank 101 via inert gas source 1140 and inert gas metering device 1148. The inert gas may be delivered to the gas head spaces 1110 and 1112 of the plating electrolyte tank 100 and the redox electrolyte tank 101, respectively. The inert gas may aid in displacing and mitigating the presence of oxygen in the plating and redox electrolyte tanks, thereby reducing oxidation and degradation of the plating and redox electrolyte and electrolyte additives (such as DPAs) therein.

When using Fe plating as the negative electrode in a battery, it is desirable to rapidly charge and discharge the battery. Furthermore, while rapidly charging the battery, it is desirable to achieve deposition of smooth, ductile, and soft Fe; in other words, depositing the Fe at higher plating and deplating current densities. As metal ion is plated onto the electrode at higher current, the resulting metal may be formed with internal plating stresses. These plating stresses, when high enough, may result in a brittle plating electrode that is susceptible to flaking, cracking, and fracturing of the electrode. When the plating electrode flakes or cracks, metal is lost from the plating electrode, and the discharge capacity of the redox flow battery cell is reduced. Furthermore, the efficiency of the redox flow battery system is reduced since the metal that detaches from the plating electrode is isolated from the redox reaction. Plating electrode DPAs may be introduced to one or both of the plating electrolyte and the redox electrolyte to help mitigate plating stress at the plating electrode during high charging rate charging of the redox flow battery cell. Fluidly contacting DPAs with the plating electrolyte and/or the redox electrolyte may mitigate plating stress at the plating electrode.

For example, in an iron redox flow battery (IFB) cell, the presence of DPAs in the plating electrolyte may reduce plating stress during charging, when iron ions in the electrolyte are reduced and plated at the plating electrode. Reducing plating stress may aid in the formation of an iron plating electrode having higher ductility and a smoother surface characteristic. Consequently, cracking or fracture and flaking off of iron at the surface of the electrode, which is caused by high plating stress, can be mitigated supplying DPAs to the plating compartment and/or the redox compartment. In the case of an iron redox flow battery system, the plating electrolyte and the redox electrolyte may comprise ferrous chloride, $FeCl_2$, potassium chloride, KCl, and boric acid, $H_3BO_3$, also known as Build of Materials (BOM) electrolyte. The concentrations of the BOM electrolyte components may include 1-2M $FeCl_2$, 2-3M KCl, and 0.4M $H_3BO_3$. Some examples of DPAs for an iron redox flow battery system with BOM electrolyte include manganese chloride, $MnCl_2$, indium chloride, $InCl_2$, or bismuth chloride, $BiCl_2$. As described above with reference to FIG. 11, redox flow battery system operating conditions such as temperature, pH, electrolyte composition, and charging current density (CCD) may also influence plating stress.

Figure 12:
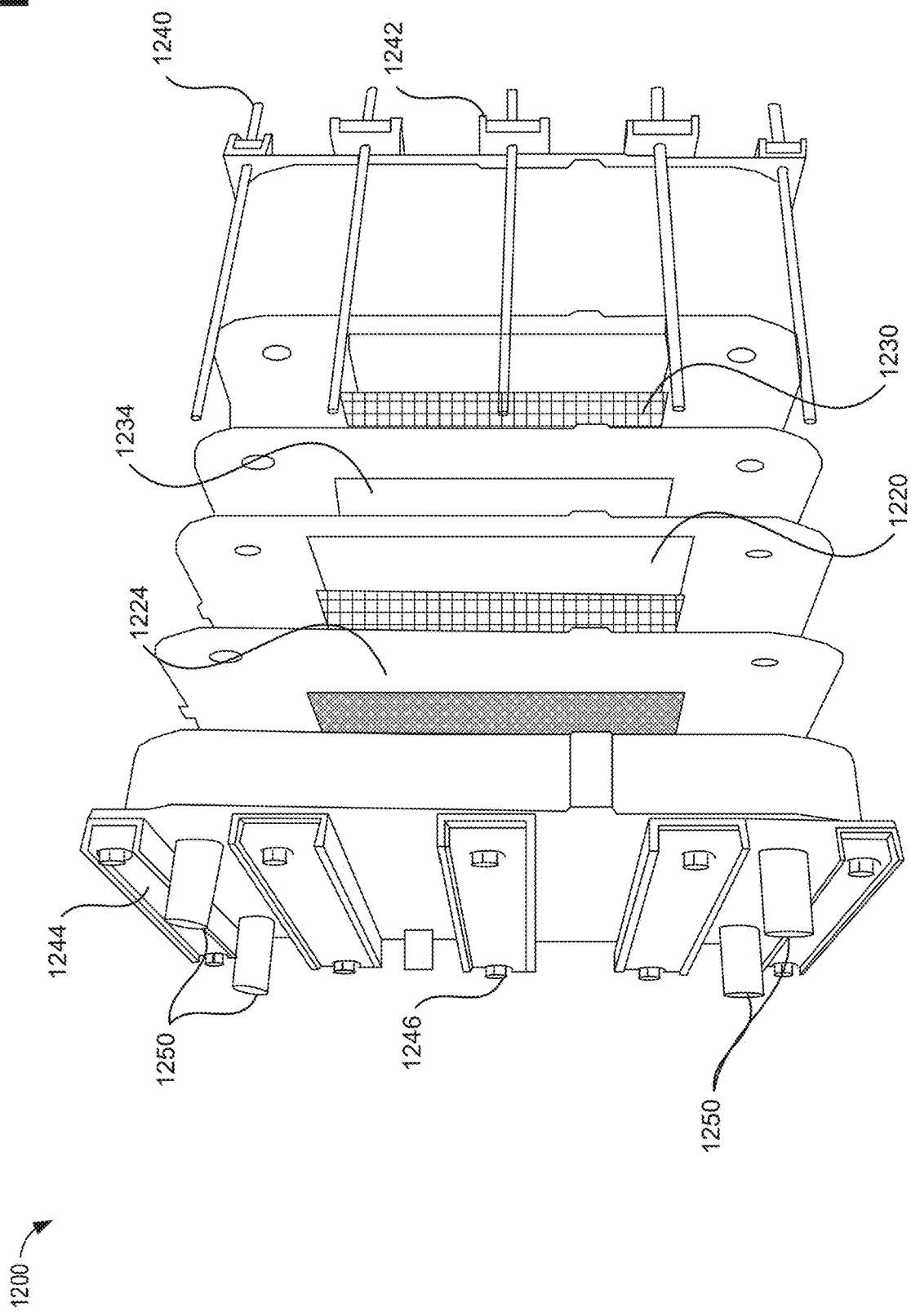
FIG. 12 is a schematic of an example redox flow battery cell assembly.

Turning now to FIG. 12, it illustrates an exploded perspective view of an example flow battery cell assembly 1200, including a positive electrode 1234, a negative electrode 1230, a conductive separator 1220, and. In one example the porous separator may include a membrane barrier, as described above with reference to FIGS. 1 and 11, while the conductive separator may include a compression molded composite. Plating and redox electrolyte may be delivered to and from the flow battery cell via the two pairs of inlet and outlet electrolyte ports 1250 positioned at a top side and bottom side of the flow battery cell, respectively. The conductive separator and porous separator may physically separate the redox electrolyte from the plating electrolyte, while allowing ionic charge communication therebetween. The flow battery cell assembly may be secured and sealed using a combination of fasteners 1240, which may include threaded bolts and nuts, and plates 1242 and 1244 at each end of the flow battery cell. As described above, the negative (plating) electrode may include a plastic or carbon mesh upon which plating metal is plated. The membrane separator separates the two electrolyte (plating and redox) compartments. Negative and positive current collectors are placed next to and insulated from two pressure plates. Pressure plates are positioned on either side of the flow plates and are fastened together, sealing the components therebetween using a plurality of fasteners, such as screws, bolts, or tie rods.

The flow battery cell assembly 1200 was utilized for carrying out electrode plating tests for evaluating DPAs with an IFB system, such as the redox flow battery system illustrated in FIG. 11. Inert argon gas was purged through the plating electrolyte tank 100 and the redox electrolyte tank 101 to mitigate oxidation of the plating and redox electrolytes during testing. Purging inert gas and mitigating oxidation of the plating and redox electrolytes includes mitigating oxidation of DPAs included in the electrolytes. Oxidation and degradation of the DPAs may reduce their effectiveness in lowering the plating stress at the plating electrode during charging. Pumps were utilized to regulate the flow rates of anolyte and catholyte to the redox flow battery cell, and heaters 1132 and 1134 thermally coupled to the backside of the current collectors were used to heat the redox flow battery cell to the desired temperatures, as indicated by the temperatures of the anolyte and catholyte flowing out of the redox flow battery cell. For larger battery stacks, the heaters 1132 and 1134 may be positioned at the plating and redox electrolyte tanks. A power supply and a DC loadbank were used to charge and discharge the battery.

Figure 13:
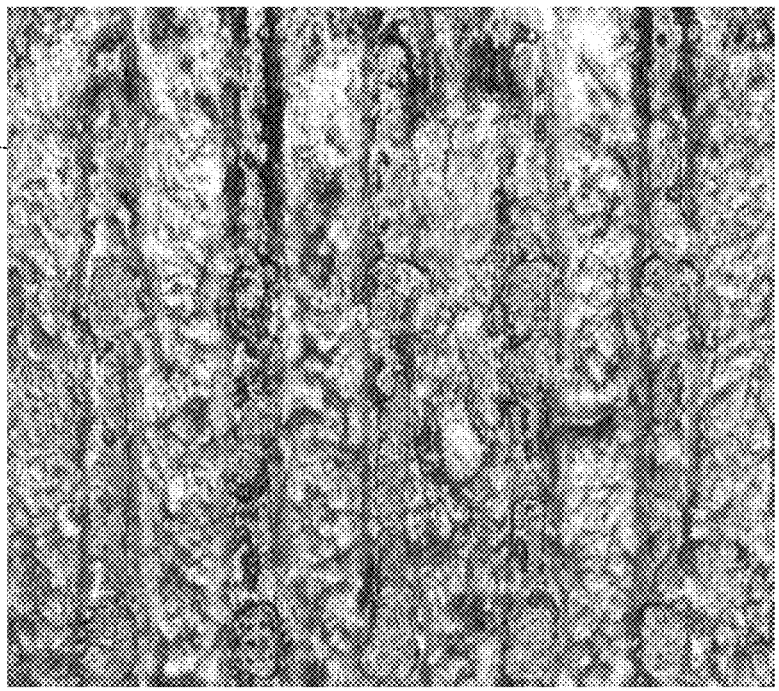
FIGS. 13 and 14 are photographs of plating electrodes.
Figure 13:
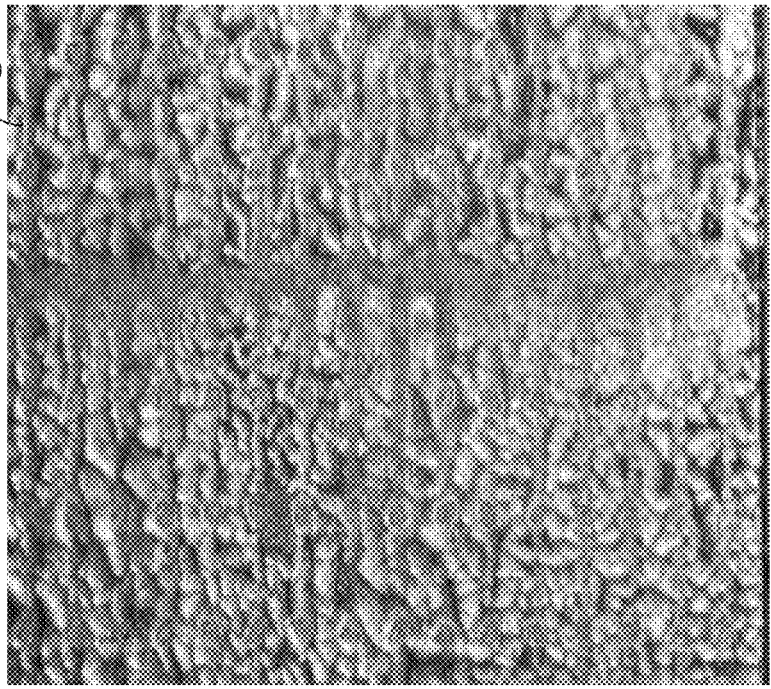
Figure 14:
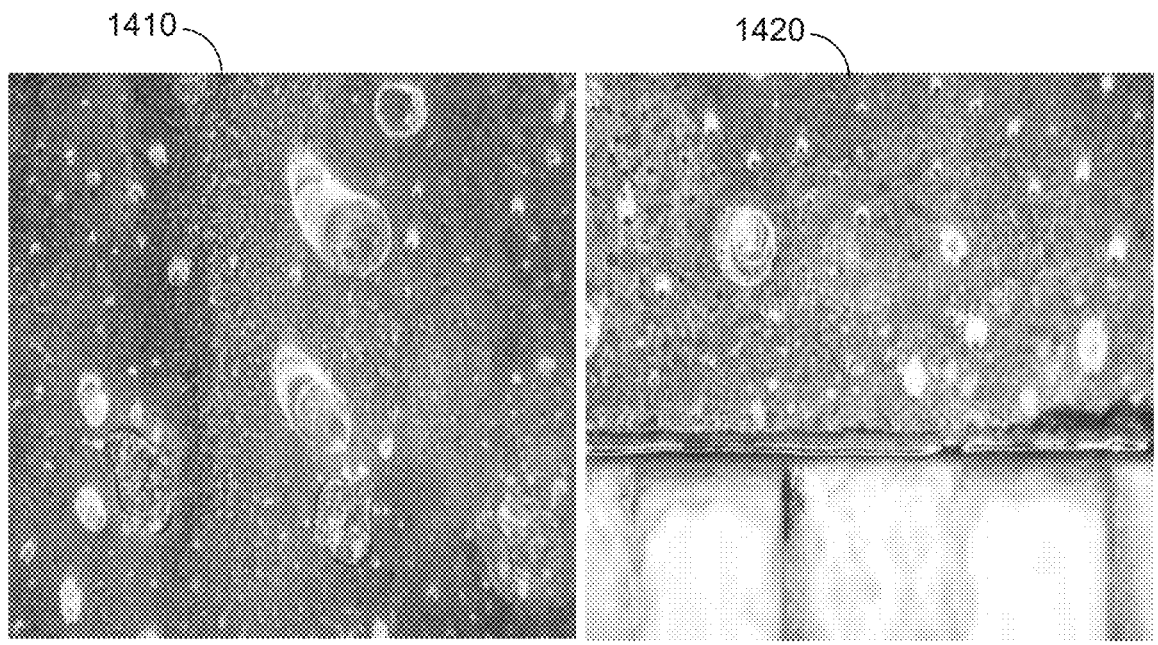
Figure 14:
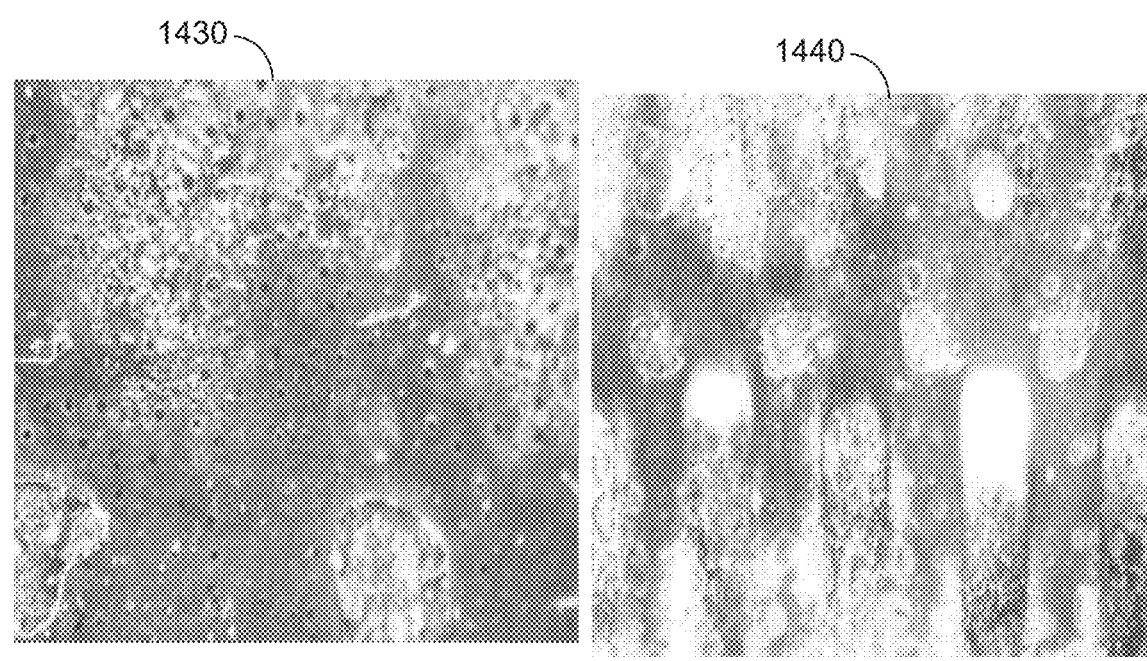

Turning now to FIGS. 13 and 14, they show photographs 1310, 1320, 1410, 1420, 1430, and 1440, of the IFB plating electrode under various plating conditions, as summarized in Table 3. For the base conditions of trial 1 including a charging current density (CCD) of 60 mA/cm2, a temperature of 60° C., electrolyte pH of 1.5, and BOM electrolyte with no DPA, the plating photograph 1310 shows a plating electrode with a rough and fissured surface, indicative of higher plating stress. Under the conditions of trial 2, the electrolyte pH is increased from 1.5 to 3 (less acidic) while CCD, temperature and electrolyte composition are maintained as in the base condition. Photograph 1320 also shows a plating electrode with a rough and fissured surface, indicative of a higher plating stress. As such increasing the pH from 1.5 to 3, while keeping other conditions at the base conditions, does not mitigate plating stress.

Under the conditions of trial 3, the CCD is lowered from 60 mA/cm2 to 15 mA/cm2, while the temperature, pH, and electrolyte composition are held at the base conditions of trial 1. As shown by photographs 1410 and 1420, the surface of the plating electrode is much smoother, and not fissured or rough, indicative of a more ductile plating electrode and also lower plating stress, as compared with the base condition (photograph 1310). Accordingly, reducing the CCD from 60 mA/cm2 to 15 mA/cm2, while the temperature, pH, and electrolyte composition are held at the base conditions of trial 1 can reduce the plating stress and produce a smooth, ductile plating electrode. Under the conditions of trial 4, a DPA, $MnCl_2$ is added to the BOM electrolyte at a concentration of 6 g/L, while maintaining the CCD, temperature, and pH at the base conditions of trial 1. As shown by photographs 1430 and 1440, the surface of the plating electrode is much smoother, and not fissured or rough, indicative of a more ductile plating electrode and also lower plating stress, as compared with the base condition (photograph 1310). Accordingly, addition of DPA ($MnCl_2$ at 6 g/L) while maintaining the CCD, temperature, and pH at the base conditions can reduce the plating stress and produce a smooth, ductile plating electrode.

TABLE 3

IFB Plating Results

| | CCD (mA/cm²) | Temp. (° C.) | pH | Electrolyte composition | Photos |
|---|---|---|---|---|---|
| 1 | 60 | 60 | 1.5 | 1M $FeCl_2$; 3M KCl; 0.4M $H_3BO_3$ | 1310 |
| 2 | 60 | 60 | 3 | 1M $FeCl_2$; 3M KCl; 0.4M $H_3BO_3$ | 1320 |
| 3 | 15 | 60 | 1.5 | 1M $FeCl_2$; 3M KCl; 0.4M $H_3BO_3$ | 1410, 1420 |
| 4 | 60 | 60 | 1.5 | 1M $FeCl_2$; 3M KCl; 0.4M $H_3BO_3$; 6 g/L $MnCl_2$ | 1430, 1440 |

Based on the IFB plating trials, increasing redox flow battery cell temperature while maintaining electrolyte composition and pH can reduce plating stress, while decreasing redox flow battery cell temperature while maintaining electrolyte composition and pH can increase plating stress. The redox flow battery cell temperature can include one or more of the plating electrolyte temperature, the redox electrolyte temperature, the plating compartment temperature, the redox compartment temperature, and the like. Furthermore, applying higher charging current densities to the redox flow battery cell during charging while maintaining electrolyte composition, pH, and temperature can induce a higher plating stress at the plating electrode, while applying lower charging current densities to the redox flow battery cell during charging while maintaining electrolyte composition, pH, and temperature can lower plating stress at the plating electrode. Further still, when the plating and redox electrolytes include BOM electrolyte (e.g., $FeCl_2$, KCl, and $H_3BO_3$), increasing the electrolyte pH does not significantly reduce the plating stress.

However, adding a DPA such as $MnCl_2$ can lower plating stress at the plating electrode, including when the charging current density is greater than a threshold charging current density. In one example, the threshold charging current density may include 60 mA/cm2, which is a typical charging current density for practical redox flow battery applications. Higher charging current densities may allow for faster charging of the redox flow battery. Increasing a concentration of the DPA, [DPA], above a threshold concentration, $[DPA]_{TH}$, may also aid in reducing the plating stress and increasing plating ductility. For example, increasing the concentration of $MnCl_2$, $[MnCl_2]$, above a threshold concentration, $[MnCl_2]_{TH}$, of 6 g/L reduces plating stress and increases plating ductility for an IFB system with BOM electrolyte. As examples, $[MnCl_2]_{TH}$, may range from 0.03 M to 3 M. When $InCl_2$ is used as a DPA, $[InCl_2]_{TH}$ may range from 0.03 M to 3 M, and when $BiCl_2$ is used as a DPA, $[BiCl_2]$ may range from 0.03 M to 3 M. Furthermore, a combination of more than on DPA may be used to increase plating ductility.

Tables 4 and 5 show flow battery cell operating conditions for another set of IFB plating tests for evaluating DPA additives. Each plating test was carried out using the electrolyte compositions shown in Table 4. The electrolyte temperatures, charging/discharging current densities, flow rates, plating density, and electrode substrate surface areas used in the plating tests are tabulated in Table 5. As described above, achieving ductile and silver Fe plating in an IFB battery is desirable because stressed (non-smooth) Fe plating can lead to cracking of the electrode, which can increase a risk of shorting the IFB as the electrode can grow and puncture the membrane separator. In order to investigate the influence of electrolyte temperature and charging current density on ductile plating, a range of plating tests were carried out varying charging current density from 14 to 90 mA/cm$^2$, and electrolyte temperature from room temperature (25° C.) to 60° C.

TABLE 4

Electrolyte composition and volume

| Species | Concentration |
|---|---|
| [Fe$^{2+}$] | 1M |
| [Fe$^{3+}$] | 0M |
| [KCl] | 2.5M |
| [H$_3$BO$_3$] | 0.4M |
| [MnCl$_2$] | 6 g/L |
| (—) pH | 1.5-4 |
| Volume | 0.15 L |

TABLE 5

IFB test cell operating conditions

| | |
|---|---|
| Electrolyte temperature | 25-60° C. |
| Charging/discharging current density | 14-90 mA/cm$^2$ |
| Voltage | 0.4 V |
| Flow rate (normalized to 660 cm$^2$) | 0.454-1.460 mLpm/cm$^2$ |

Figure 17:
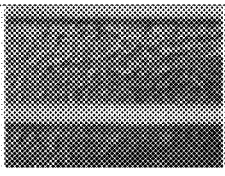
FIG. 17 is a chart showing plating results based on electrolyte temperature.
Figure 17:
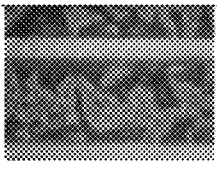
Figure 17:
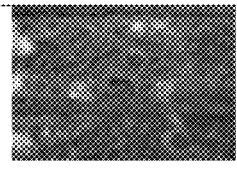
Figure 17:
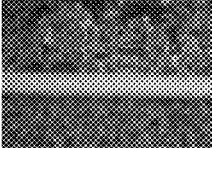
Figure 17:
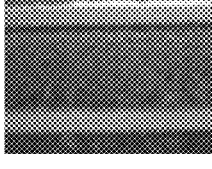
Figure 17:
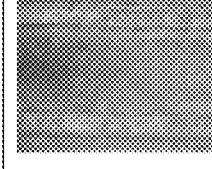
Figure 17:
Figure 17:
Figure 17:
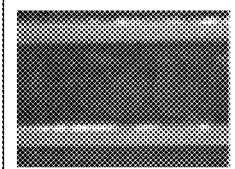
Figure 17:
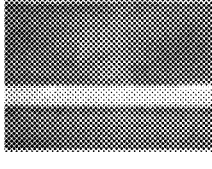
Figure 17:
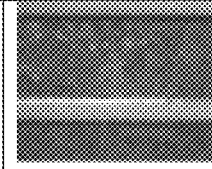
Figure 17:
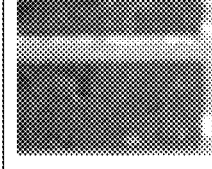

Turning now to FIG. 17, it illustrates a chart 1700 summarizing the plating test results. The images shown in the chart 1700 clearly illustrate that plating at lower temperatures (e.g., 25° C. and 40° C.) resulted in darker and more highly stressed plating of the electrode, whereas plating at higher temperatures (50° C. and 60° C.) resulted in smoother and silver plating of the electrode. Second, at the lower temperatures, although the plated electrodes were dark and stressed, they did not always crack. For example, at 25° C., the Fe plating did not crack when the charging current density was 14 mA/cm$^2$, however the Fe plating did crack when the charging current density was raised to 25 mA/cm$^2$. Similarly, at 40° C., the Fe plating was smoother at a charging current density of 25 mA/cm$^2$, was darker and more stressed at 45 mA/cm$^2$, and began to show cracking at 54 mA/cm$^2$. Third, at both 50° C. and 60° C., Fe plating was significantly better than any plating at the lower electrolyte temperatures. Plating at higher electrolyte temperatures tended to be more homogeneous, silver, and smooth, and the plating electrode morphology (stress, smoothness, cracking, and the like) exhibited much less sensitivity to the charging current density. Practically, this characteristic is advantageous because IFB systems generally run at higher temperatures around 50-60° C. Last, pH was varied from 1.5 to 4 at 50° C. and 45 mA/cm$^2$. Upon disassembly of the IFB cell, there was no observable difference in plating quality between the plating tests run at low pH (1.5) and higher pH (4).

Figure 16:
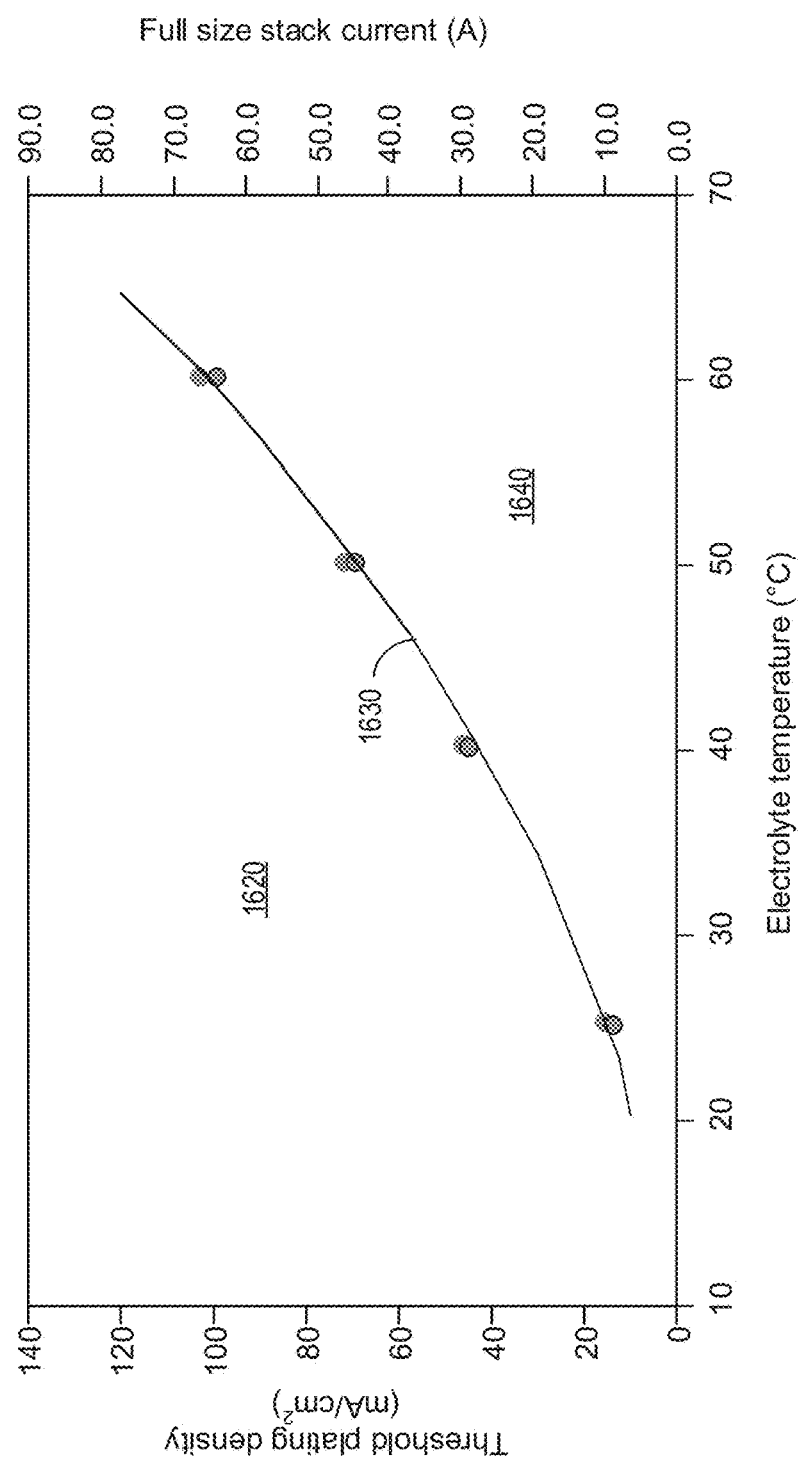
FIG. 16 is a plot of charging current density versus electrolyte temperature.

Based on the plating test results of Tables 4-5 and chart 1700 of FIG. 17, plating density versus electrolyte temperature was correlated and plotted, as shown in FIG. 16. The correlated model trend line 1630 may be referenced by an IFB control system 1190 algorithm to responsively adjust electrolyte temperature, electrolyte composition, and/or charging current density in order to maintain operation of the IFB system within a ductile plating region 1640 so that electrode plating quality can be increased and a risk of higher stress plating and cracking of the plating electrode can be reduced.

Figure 15:
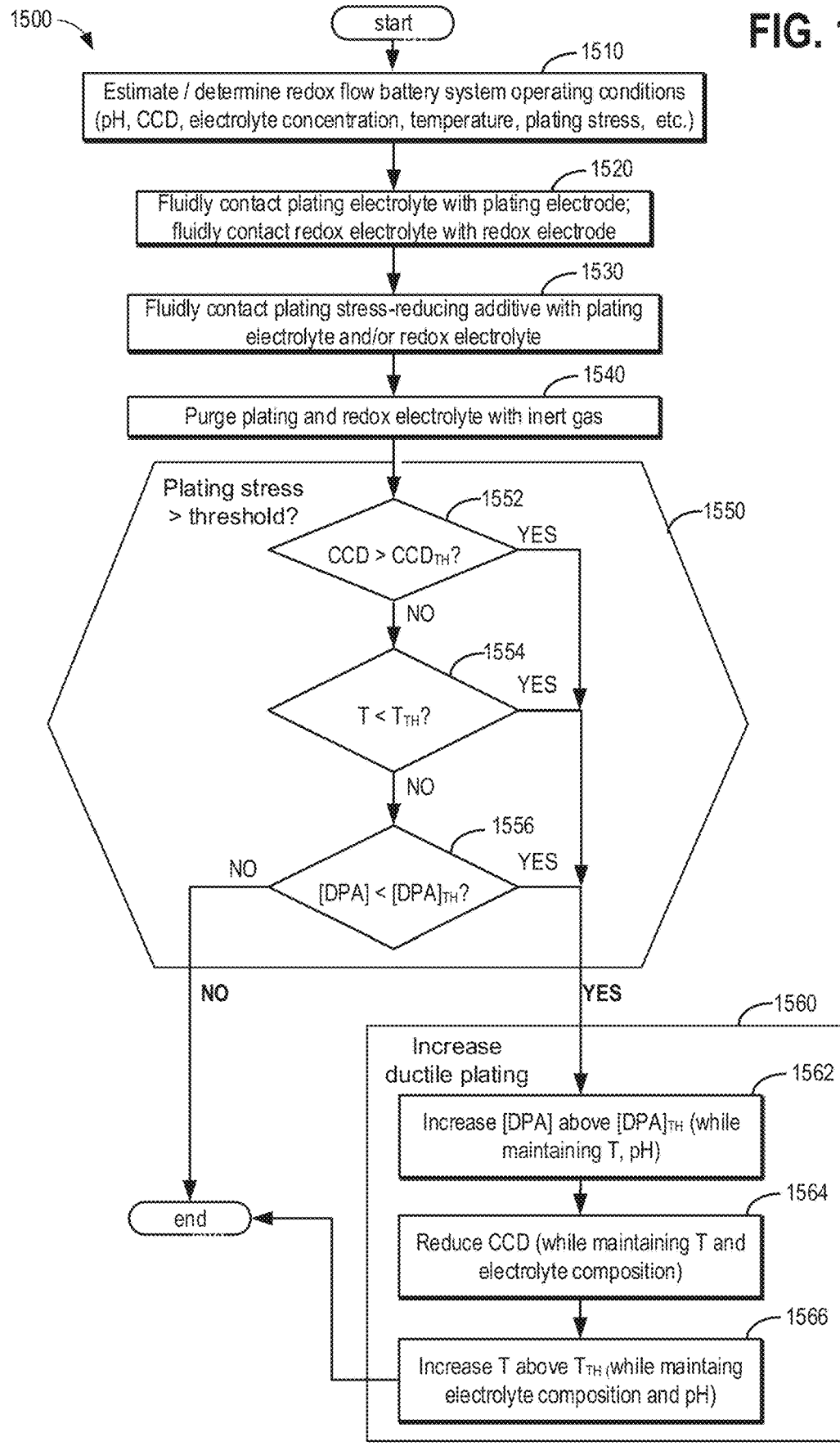
FIG. 15 is a flow chart of an example method of operating a redox flow battery system.

Turning now to FIG. 15, it illustrates an example flow chart for a method 1500 of operating a redox flow battery system. Method 1500 may include executable instructions on board a control system 1190 of a redox flow battery system. Method 1500 begins at 1510 where the redox flow battery system operating conditions such as pH, CCD, electrolyte composition, temperature, plating stress indicators, and the like, are estimated and/or determined. As an example, the control system 1190 may receive signals transmitted from sensors 102, 104, 126, 128, 136, and 138 indicating various redox flow battery operating conditions. Control system 1190 may further perform calculations based on these transmitted signals to estimate or model the plating stress or other operating conditions. Method 1500 continues at 1520 where the plating electrolyte and redox electrolyte are fluidly contacted with the plating electrode and the redox electrode. Fluidly contacting the plating and redox electrolytes with the plating and redox electrodes, respectively, may include operating pumps 130 to recirculate plating and redox electrolytes from the plating and redox electrolyte tanks 100 and 101, respectively, to the plating and redox compartments 122 and 124, respectively. Next, method 1500 continues at 1530 where one or more ductile plating additives (DPAs) are fluidly contacted with the plating electrolyte and/or the redox electrolyte. As discussed above with reference to FIG. 11, fluidly contacting the DPAs with the electrolyte may include supplying DPA to the redox flow battery cell from additional tanks 106 and 108 via pumps 110 and 112. At 1540, inert gas may be supplied to the plating and redox compartments to pure the plating and redox electrolyte. As discussed above with reference to FIG. 12, the inert gas may comprise argon gas, and may be metered into the headspace of the plating electrolyte tank 100 and the redox electrolyte tank 101, to displace oxygen and to reduce oxidation of the electrolyte. Other inert gases such as nitrogen and helium may also be used.

Method 1500 continues at 1550, where the plating stress at the plating electrode is evaluated. The plating stress may be measured directly using one or more sensors or measurements methods, or the plating stress may be estimated indirectly by one or more sensors or measurement methods, or may be estimated indirectly through empirical models based on flow battery operating conditions. As described above, direct measurement methods can include spiral contractometers, bent strip sensors, and internal stress sensors to detect if a plating stress has increased and/or if a plating stress is greater than a threshold plating stress at 1550. In another example, loose Fe particles or flakes in the electrolyte may be collected at the outlet of the plating electrolyte tank 100 (negative electrolyte tank) to aid in quantifying or estimating plating stresses at the plating electrode 114. Alternately, the plating stress can be estimated indirectly based on empirical models from measured flow battery operating conditions. As further examples, at 1552, method 1500 may determine if the charging current density, CCD, is greater than a threshold charging current density, CCD$_{TH}$. At higher values of CCD, the plating stress can be higher, and the risk of cracking, flaking, and fracture of the plating electrode increases. In one example, the CCD$_{TH}$ may include 60 mA/cm2. If CCD≤CCD$_{TH}$, method 1500 continues at 1554 where the control system 1190 may determine if the temperature, T, is less than a threshold temperature, T$_{TH}$. The temperature may include one or a combination of redox flow battery system temperatures including the plating electrolyte temperature, the redox electrolyte temperature, the plating tank temperature, the redox tank temperature, and the outlet temperature of the electrolyte from the plating compartment or the redox compartment, as indicated by sensors 1138, 1136, 128, 126, 102, and 104.

The plating stress is reduced as the redox flow battery cell temperature is increased, and below $T_{TH}$ plating stress is higher, and the risk of flacking, cracking, and fracture of the plating electrode is raised. The threshold temperature may thus correspond to a temperature of the redox flow battery system below which the degradation of the plating electrode due to high plating stress is increased. In one example, the threshold temperature may be 50° C. In other examples, as indicated by plot 1600, the threshold temperature may increase as the charging current density is increased, as shown by trend line 1630. Further still, the threshold temperature may increase as the DPA concentration is reduced. Further still, the threshold charging current density may increase as the electrolyte temperature is increased, and may increase as the DPA concentration is increased. Similarly, the threshold DPA concentration may be reduced as the electrolyte temperature increases, and may increase as the charging current density is increased.

If $T \geq T_{TH}$, method 1500 continues at 1556 where the control system 1190 determines if a concentration of ductile plating additive, [DPA], is less than a threshold concentration, $[DPA]_{TH}$. DPA may be fluidly contacted with the plating electrode and the redox electrolyte to aid in reducing plating stress at the plating electrode during charging of the redox flow battery system. Increasing the concentration of DPAs in the redox flow battery cell electrolyte can increase ductile plating at the plating electrode. For example, adding $MnCl_2$ to BOM electrolyte in an IFB battery system, as described above with reference to FIGS. 11-14, can mitigate degradation of the plating electrode caused by higher plating stresses. In the case of an IFB battery system with BOM electrolyte, the $[DPA]_{TH}$ may be 6 g/L. Method 1500 may further evaluate a flow rate of DPA metered to the redox flow battery cell, and determine if the flow rate of DPA is less than a threshold flow rate. The flow rate of DPA provide an approximate estimate of the concentration of DPA in the plating compartment, based on the electrolyte flow to and from the redox flow battery cell, the charging and discharging current densities, and the like. If $[DPA] \geq [DPA]_{TH}$, method 1500 ends.

In response to the plating stress being greater than a threshold plating stress at 1550, $CCD > CCD_{TH}$ at 1552, $T < T_{TH}$ at 1554, or $[DPA] < [DPA]_{TH}$ (or the flow rate of DPA<threshold flow rate), method 1500 continues at 1560, where the control system 1190 takes action to increase ductile plating (or reduce the plating stress). In one example, at 1562, the control system 1190 may increase the [DPA] above $[DPA]_{TH}$ responsive to the plating stress being greater than a threshold plating stress at 1550, $CCD > CCD_{TH}$ at 1552, $T < T_{TH}$ at 1554, or $[DPA] < [DPA]_{TH}$ (or the flow rate of DPA<threshold flow rate). Increasing [DPA] may comprise increasing the flow rate of DPA to the electrolyte. For example, the control system 1190 may increase a metering rate of metering additive pumps 110 and/or 112 to increase the supply rate of DPA to one or both of the plating and redox compartments. Furthermore, control system 1190 may increase $[DPA] > [DPA]_{TH}$ while maintaining the redox flow battery cell temperature and pH. The control system 1190 may receive signals from one or more sensors 102, 104, 128, 126, 1138, 1136 indicating [DPA] in the redox flow battery system.

Method 1500 continues at 1564 where the control system 1190 may reduce the CCD supplied to the redox flow battery cell responsive to the plating stress being greater than a threshold plating stress at 1550, $CCD > CCD_{TH}$ at 1552, $T < T_{TH}$ at 1554, or $[DPA] < [DPA]_{TH}$ (or the flow rate of DPA<threshold flow rate). Reducing the CCD may aid in reducing plating stress at the plating electrode during charging. In one example, the CCD may be reduced below $CCD_{TH}$ by the control system 1190. Furthermore, the CCD may be reduced while maintain a temperature of the redox flow battery cell and the electrolyte composition. Because lowering CCD during charging reduces the charging rate of the battery cell, other methods of reducing plating stress such as increasing temperature or increasing [DPA] may be prioritized by the control system 1190 to preserve a usability of the redox flow battery cell. At 1566, the control system 1190 may further reduce plating stress by increasing a redox flow battery system temperature responsive to the plating stress being greater than a threshold plating stress at 1550, $CCD > CCD_{TH}$ at 1552, $T < T_{TH}$ at 1554, or $[DPA] < [DPA]_{TH}$ (or the flow rate of DPA<threshold flow rate). The control system 1190 may regulate the electrolyte temperature by controlling heaters 1132 and 1134 thermally coupled to the redox flow battery cell. For example, increasing a voltage supplied to the heaters 1132 and 1134 may increase the amount of heat delivered to the redox flow battery cell, which can increase the temperature thereof. In some examples, the temperature may be increased above a threshold temperature, $T_{TH}$. Furthermore, the temperature may be increased while maintaining the electrolyte composition and pH. After 1566, method 1500 ends.

In this manner, a method of operating an iron redox flow battery system may comprise fluidly coupling a plating electrode of an iron redox flow battery cell to a plating electrolyte; fluidly coupling a redox electrode of the iron redox flow battery cell to a redox electrolyte; fluidly coupling a ductile plating additive to one or both of the plating electrolyte and the redox electrolyte; and increasing a flow rate of the ductile plating additive to the plating electrolyte in response to an increase in the plating stress at the plating electrode. Furthermore, the method may comprise increasing a flow rate of the ductile plating additive to the redox electrolyte in response to the increase in the plating stress at the plating electrode. Moreover, the method may comprise raising a plating electrolyte temperature responsive to the increase in the plating stress at the plating electrode. Further still, the method may comprise raising a redox electrolyte temperature responsive to the increase in the plating stress at the plating electrode, and raising a plating electrolyte temperature responsive to the increase in the plating stress at the plating electrode while maintaining a plating electrolyte composition and a plating electrolyte pH.

The redox electrolyte temperature may be raised responsively to the increase in the plating stress at the plating electrode while maintaining a redox electrolyte composition and a redox electrolyte pH. Furthermore, the method may comprise reducing a charging current density applied to the redox flow battery cell responsive to the increase in the plating stress of the plating electrode. The charging current density applied to the redox flow battery cell may be reduced responsive to the increase in the plating stress of the plating electrode while maintaining a plating electrolyte composition and a plating electrolyte temperature. Further still, one or both of the plating electrolyte and the redox electrolyte may be purged with an inert gas. Further still, fluidly coupling a ductile plating additive to one or both of the plating electrolyte and the redox electrolyte may include supplying $MnCl_2$ to one or both of the plating electrolyte and the redox electrolyte, wherein the plating electrolyte and the redox electrolyte comprise $FeCl_2$, KCl, and $H_3BO_3$.

In another embodiment, a method of operating an iron redox flow battery system, may comprise: responsive to a charging current density applied to an iron redox flow battery (IFB) cell increasing above a threshold charging current density, raising a concentration of a ductile plating additive above a threshold concentration in a plating electrolyte fluidly coupled to a plating electrode. The method may further comprise increasing a temperature of the IFB cell while maintaining a composition of the plating electrolyte and the concentration of the ductile plating additive responsive to the charging current density applied to the IFB cell increasing above the threshold charging current density. Furthermore the method may reduce the concentration of the ductile plating additive responsive to the charging current density applied to the IFB cell decreasing below the threshold charging current density.

In another embodiment, a redox flow battery system may comprise: redox flow battery cell, including a plating compartment and a redox compartment; a plating electrode fluidly coupled to a plating electrolyte in the plating compartment; a redox electrode fluidly coupled to a redox electrolyte in the redox compartment; a ductile plating additive fluidly coupled to one or both of the plating electrolyte and the redox electrolyte; and a controller, including executable instructions to raise a concentration of the ductile plating additive in one or both of the plating compartment and the redox compartment in response to a charging current density increasing above a threshold charging current density. The executable instructions may further include raising the concentration of the ductile plating additive in one or both of the plating compartment and the redox compartment in response to the charging current density increasing above the threshold charging current density while maintaining a temperature of the plating compartment and the redox compartment. Furthermore, the executable instructions may include raising the concentration of the ductile plating additive in one or both of the plating compartment and the redox compartment in response to the charging current density increasing above the threshold charging current density while maintaining a pH of the plating electrolyte and the redox electrolyte. In some examples, the redox flow battery system may comprise a heater thermally coupled to the plating compartment, and the executable instructions may include increasing an amount of heat supplied to the plating compartment from the heater in response to the charging current density increasing above the threshold charging current density.

Moreover, the amount of heat supplied to the plating compartment from the heater may be increased in response to the charging current density increasing above the threshold charging current density, while maintaining a composition of the plating electrolyte. Furthermore, the executable instructions may include decreasing the concentration of the ductile plating additive in one or both of the plating compartment and the redox compartment in response to the charging current density decreasing below the threshold charging current density. In one example, the plating electrolyte and the redox electrolyte may include one or more of $FeCl_2$, $KCl$, and $H_3BO_3$, and the ductile plating additive may include $MnCl_2$.

It will be appreciated that the configurations and routines disclosed herein are exemplary in nature, and that these specific embodiments are not to be considered in a limiting sense, because numerous variations are possible. For example, the above technology may be applied to other flow battery types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

Such claims, whether broader, narrower, equal, or different in scope to the original claims, also are regarded as included within the subject matter of the present disclosure.

The invention claimed is:

1. A method of operating an iron redox flow battery system, comprising:
 fluidly coupling a plating electrode of an iron redox flow battery cell to a plating electrolyte;
 fluidly coupling a redox electrode of the iron redox flow battery cell to a redox electrolyte;
 fluidly coupling a ductile plating additive to one or both of the plating electrolyte and the redox electrolyte; and
 increasing a first amount of the ductile plating additive delivered to the plating electrolyte in response to an increase in a plating stress at the plating electrode, the increase determined by monitoring one or more operating parameters during charging of the iron redox flow battery system.

2. The method of claim 1, further comprising increasing a second amount of the ductile plating additive delivered to the redox electrolyte in response to the increase in the plating stress at the plating electrode.

3. The method of claim 2, further comprising raising a plating electrolyte temperature responsive to the increase in the plating stress at the plating electrode.

4. The method of claim 3, further comprising raising a redox electrolyte temperature responsive to the increase in the plating stress at the plating electrode.

5. The method of claim 4, further comprising raising the plating electrolyte temperature responsive to the increase in the plating stress at the plating electrode while maintaining a plating electrolyte composition and a plating electrolyte pH.

6. The method of claim 5, further comprising raising the redox electrolyte temperature responsive to the increase in the plating stress at the plating electrode while maintaining a redox electrolyte composition and a redox electrolyte pH.

7. The method of claim 6, further comprising reducing a charging current density applied to the redox flow battery cell responsive to the increase in the plating stress of the plating electrode.

8. The method of claim 7, further comprising reducing the charging current density applied to the redox flow battery cell responsive to the increase in the plating stress of the plating electrode while maintaining the plating electrolyte composition and the plating electrolyte temperature.

9. The method of claim 8, further comprising purging one or both of the plating electrolyte and the redox electrolyte with an inert gas.

10. The method of claim 9, wherein fluidly coupling the ductile plating additive to one or both of the plating electrolyte and the redox electrolyte includes supplying $MnCl_2$ to one or both of the plating electrolyte and the redox electrolyte, wherein the plating electrolyte and the redox electrolyte comprise $FeCl_2$, KCl, and $H_3BO_3$.

11. A method of operating an iron redox flow battery system, comprising:

responsive to a charging current density applied to an iron redox flow battery (IFB) cell increasing above a threshold charging current density, raising a concentration of a ductile plating additive above a threshold concentration in a plating electrolyte fluidly coupled to a plating electrode, during charging of the iron redox flow battery system.

12. The method of claim 11, further comprising increasing a temperature of the IFB cell while maintaining a composition of the plating electrolyte and the concentration of the ductile plating additive responsive to the charging current density applied to the IFB cell increasing above the threshold charging current density.

13. The method of claim 12, further comprising reducing the concentration of the ductile plating additive responsive to the charging current density applied to the IFB cell decreasing below the threshold charging current density.

14. A redox flow battery system, comprising:
- a redox flow battery cell, including a plating compartment and a redox compartment;
- a plating electrode fluidly coupled to a plating electrolyte in the plating compartment;
- a redox electrode fluidly coupled to a redox electrolyte in the redox compartment;
- a ductile plating additive stored in one or more storage tanks fluidly coupled to one or both of the plating electrolyte and the redox electrolyte; and
- a controller, including executable instructions to raise a concentration of the ductile plating additive in one or both of the plating compartment and the redox compartment in response to a charging current density increasing above a threshold charging current density during charging of the redox flow battery system.

15. The redox flow battery system of claim 14, wherein the executable instructions further include raising the concentration of the ductile plating additive in one or both of the plating compartment and the redox compartment in response to the charging current density increasing above the threshold charging current density while maintaining a temperature of the plating compartment and the redox compartment.

16. The redox flow battery system of claim 15, wherein the executable instructions further include raising the concentration of the ductile plating additive in one or both of the plating compartment and the redox compartment in response to the charging current density increasing above the threshold charging current density while maintaining a pH of the plating electrolyte and the redox electrolyte.

17. The redox flow battery system of claim 16, further comprising a heater thermally coupled to the plating electrolyte, wherein the executable instructions further include increasing an amount of heat supplied to the plating electrolyte from the heater in response to the charging current density increasing above the threshold charging current density.

18. The redox flow battery system of claim 17, wherein the executable instructions further include increasing the amount of heat supplied to the plating electrolyte from the heater in response to the charging current density increasing above the threshold charging current density, while maintaining a composition of the plating electrolyte.

19. The redox flow battery system of claim 18, wherein the executable instructions further include decreasing the concentration of the ductile plating additive in one or both of the plating compartment and the redox compartment in response to the charging current density decreasing below the threshold charging current density.

20. The redox flow battery system of claim 19, wherein the plating electrolyte and the redox electrolyte comprise one or more of $FeCl_2$, KCl, and $H_3BO_3$, and the ductile plating additive comprises one or more of $MnCl_2$, $InCl_2$, and $BiCl_2$.

* * * * *